US011888686B2

(12) United States Patent
Jagadeesh et al.

(10) Patent No.: US 11,888,686 B2
(45) Date of Patent: Jan. 30, 2024

(54) ADMIN CHANGE RECOMMENDATION IN AN ENTERPRISE

(71) Applicant: Microsoft Technology Licensing, LLC, Redmond, WA (US)

(72) Inventors: Toshitha Jagadeesh, Seattle, WA (US); David C. James, Snohomish, WA (US); Brad R. Anderson, Sammamish, WA (US); Yian Mo, Redmond, WA (US); Brett Damon Alan Flegg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 16/801,115

(22) Filed: Feb. 25, 2020

(65) Prior Publication Data
US 2021/0135938 A1 May 6, 2021

Related U.S. Application Data

(60) Provisional application No. 62/929,753, filed on Nov. 1, 2019.

(51) Int. Cl.
*H04L 41/0813* (2022.01)
*G06Q 10/0631* (2023.01)
*G06Q 30/0208* (2023.01)

(52) U.S. Cl.
CPC ... *H04L 41/0813* (2013.01); *G06Q 10/06313* (2013.01); *G06Q 30/0208* (2013.01)

(58) Field of Classification Search
CPC .......... H04L 41/0813; G06Q 10/06313; G06Q 30/0208
See application file for complete search history.

(56) References Cited

U.S. PATENT DOCUMENTS

2009/0299923 A1\* 12/2009 Fletcher ................. G06Q 10/06
706/50
2010/0070319 A1   3/2010 Prafullchandra et al.
(Continued)

OTHER PUBLICATIONS

"International Search Report and Written Opinion Issued in PCT Application No. PCT/US20/056225", dated Jan. 22, 2021, 13 Pages.

*Primary Examiner* — Dhairya A Patel
*Assistant Examiner* — Eui H Kim
(74) *Attorney, Agent, or Firm* — Wade IP Law PLLC

(57) ABSTRACT

Techniques are described herein that are capable of providing a recommendation of an admin change (i.e., an admin change recommendation) in an enterprise. A type of intended admin change that an administrator is to perform with regard to an enterprise is determined. The type is cross-referenced with information indicating admin changes made by administrator(s) in environment(s) of enterprise(s) and values of metrics resulting therefrom to identify subsets of the information to which the type corresponds. A causal relationship is inferred between admin change(s) made after an admin change of the type and an increase in value(s) of metric(s) that are indicated by information in the subsets. A recommended admin change is recommended to be performed by the administrator based at least in part on a causal relationship between the recommended admin change and an increase in at least one of the value(s) of at least one of the respective metric(s).

21 Claims, 8 Drawing Sheets

(56) References Cited

U.S. PATENT DOCUMENTS

| | | | | |
|---|---|---|---|---|
| 2013/0185807 | A1* | 7/2013 | Rodriguez | G06F 21/10 |
| | | | | 726/28 |
| 2014/0215077 | A1* | 7/2014 | Soudan | H04L 47/11 |
| | | | | 709/226 |
| 2015/0186660 | A1* | 7/2015 | Sherrets | G06F 21/606 |
| | | | | 726/30 |
| 2015/0220324 | A1* | 8/2015 | Arcese | G06F 8/63 |
| | | | | 717/170 |
| 2016/0274893 | A1* | 9/2016 | Thomas | G06F 8/71 |
| 2017/0207980 | A1* | 7/2017 | Hudis | H04L 41/0803 |
| 2018/0232517 | A1* | 8/2018 | Roth | G06F 21/53 |
| 2018/0268347 | A1* | 9/2018 | Benedetti | G06Q 30/0631 |
| 2018/0285750 | A1* | 10/2018 | Purushothaman | G06N 5/045 |
| 2019/0108015 | A1* | 4/2019 | Sridhara | G06F 9/4451 |
| 2019/0123973 | A1* | 4/2019 | Jeuk | G06F 9/5027 |
| 2019/0318366 | A1* | 10/2019 | Carranza | G06N 3/08 |
| 2021/0064759 | A1* | 3/2021 | Lomonaco | H04L 63/1433 |
| 2021/0117172 | A1* | 4/2021 | Gopinathan Nair | G06F 8/60 |
| 2021/0406041 | A1* | 12/2021 | Saraiya | G06F 9/451 |

\* cited by examiner

700

```
// Calculation of user experience score (ue_score) for a device
ue_score = 0;
for each metric
{
z_score = min(5, max(-5,(instance - mean)/standard_ deviation));
metric_value = (-1*z_score + 5/10);
ue_score += metric_value * metric_weight;
}
next metric;
return ue_score;
```

ADMIN CHANGE RECOMMENDATION IN AN ENTERPRISE

CROSS-REFERENCE TO RELATED APPLICATION(S)

This application claims the benefit of U.S. Provisional Application No. 62/929,753, filed Nov. 1, 2019 and entitled "Admin Change Recommendation in an Enterprise," the entirety of which is incorporated herein by reference.

BACKGROUND

Organizations often spend a substantial amount of money on enterprise management tools to maintain the health and security of the devices in their enterprises. Although an organization may have employees to use enterprise management tools to oversee the devices in the company's enterprise, this may not be the employees' primary role or even their top priority. Thus, information technology (IT) administrators may not be managing their devices in an efficient manner due to a lack of training, information, and/or time. This incompetence does not allow the companies to fully utilize enterprise tools and may lead to gaps in performance and security risks ultimately affecting the day-to-day functionalities of the companies.

Administrators may be provided with training, customer support channels, and customer open sourced solutions to familiarize themselves with and to use specific enterprise management tools. Although these platforms may be helpful, some information may not be accessible to the customer due to lack of resources. Likewise, inexperienced administrators may trust these channels too whole-heartedly, which may lead to introducing new facets to their device management technique that might be unnecessary given their specific situation.

SUMMARY

Various approaches are described herein for, among other things, providing a recommendation of an admin change (i.e., an admin change recommendation) in an enterprise. An admin change is a change to a configuration of an enterprise. For instance, the admin change recommendation may be provided via an enterprise management tool that is used by an administrator to perform system management of the enterprise. Systems management typically refers to enterprise-wide administration of distributed systems (e.g., computer systems). Some example tasks that may be performed via systems management include but are not limited to anti-manipulation management, anti-virus and anti-malware management, security management, storage management, capacity monitoring, server availability monitoring and metrics, monitoring of user activities, network capacity and utilization monitoring, hardware inventory, and software inventory and installation. Systems management often includes a variety of functional components, including but not limited to data center infrastructure management, help desk management, network management, security information and event management, and configuration management. Configuration management typically handles changes in a system systematically to maintain integrity of the system. Such changes may be implemented for beneficial purposes, including but not limited to revising capability of the system; increasing performance, reliability, and/or maintainability of the system; extending life of the system; reducing cost, risk, and/or liability of the system; and correcting defect(s) of the system.

In a first example approach, information indicating admin changes made by administrators in environments of enterprises and further indicating values of metrics resulting from the admin changes is collected. The information is analyzed and categorized into categories based at least in part on characteristic(s) of the environments in which the admin changes are made. A type of intended admin change that an administrator is to perform with regard to an enterprise is determined based at least in part on an operation performed by the administrator using an enterprise management tool. The type of the intended admin change is cross-referenced with the information to identify subsets of the information to which the type corresponds. A causal relationship is inferred between admin change(s) that were made after an admin change of the type, as indicated by the information that is in the subsets, and an increase in value(s) of respective metric(s) that are indicated by the information that is in the subsets, by analyzing the subsets, based at least in part on cross-referencing the type of the intended admin change with the information that is in the subsets. A recommended admin change, which the information in at least one subset indicates to have been made after an admin change of the type, is recommended to be performed by the administrator based at least in part on one or more categories into which the at least one subset is categorized and further based at least in part on a causal relationship between the recommended admin change and an increase in at least one of the value(s) of at least one of the respective metric(s).

In a second example approach, a type of intended admin change that an administrator is to perform with regard to an enterprise is determined based at least in part on an operation performed by the administrator using an enterprise management tool. The type of the intended admin change is cross-referenced with information indicating admin changes made by administrators in respective environments of respective enterprises and further indicating values of metrics resulting from the admin changes to identify subsets of the information to which the type corresponds. A causal relationship is inferred between admin change(s) that were made after an admin change of the type, as indicated by the information that is in the subsets, and an increase in value(s) of respective metric(s) that are indicated by the information that is in the subsets, by analyzing the subsets, based at least in part on cross-referencing the type of the intended admin change with the information that is in the subsets. A recommended admin change, which the information in at least one subset indicates to have been made after an admin change of the type, is recommended to be performed by the administrator based at least in part on one or more categories into which the at least one subset is categorized and further based at least in part on a causal relationship between the recommended admin change and an increase in at least one of the value(s) of at least one of the respective metric(s). The information is categorized into categories that include the one or more categories based at least in part on characteristic(s) of the environments in which the admin changes are made.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
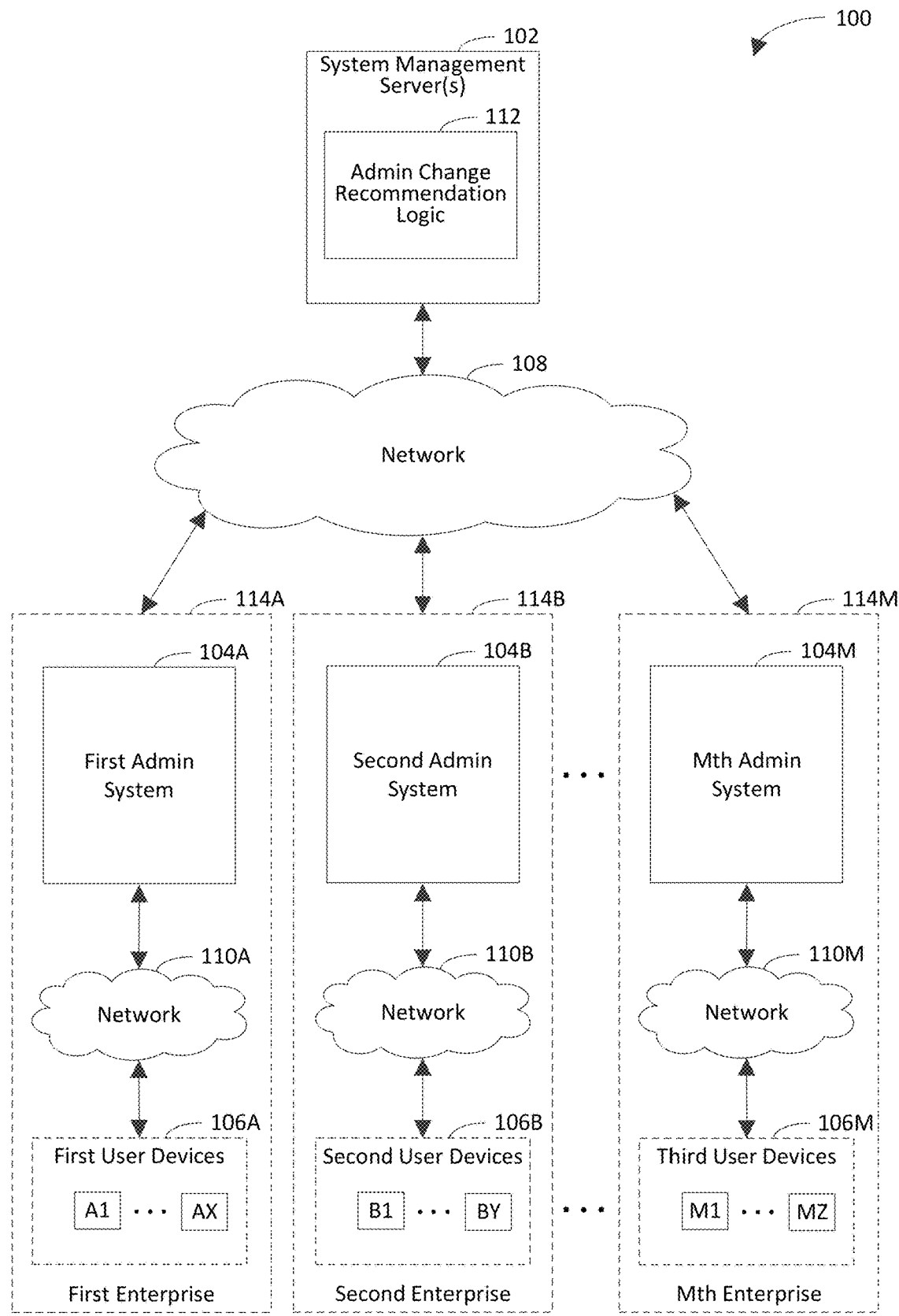
FIG. 1 is a block diagram of an example admin change recommendation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of providing a recommendation of an admin change (i.e., an admin change recommendation) in an enterprise. An admin change is a change to a configuration of an enterprise. For instance, the admin change recommendation may be provided via an enterprise management tool that is used by an administrator to perform system management of the enterprise. Systems management typically refers to enterprise-wide administration of distributed systems (e.g., computer systems). Some example tasks that may be performed via systems management include but are not limited to anti-manipulation management, anti-virus and anti-malware management, security management, storage management, capacity monitoring, server availability monitoring and metrics, monitoring of user activities, network capacity and utilization monitoring, hardware inventory, and software inventory and installation. Systems management often includes a variety of functional components, including but not limited to data center infrastructure management, help desk management, network management, security information and event management, and configuration management. Configuration management typically handles changes in a system systematically to maintain integrity of the system. Such changes may be implemented for beneficial purposes, including but not limited to revising capability of the system; increasing performance, reliability, and/or maintainability of the system; extending life of the system; reducing cost, risk, and/or liability of the system; and correcting defect(s) of the system.

Example techniques described herein have a variety of benefits as compared to conventional system management techniques. For instance, the example techniques may be capable of recommending admin changes to an information technology (IT) administrator to facilitate with system management of an enterprise that the administrator manages. The example techniques may reduce an amount of time and/or resources (e.g., processor cycles, memory, network bandwidth) that is consumed to manage a system. The example techniques may reduce a cost associated with managing the system. For instance, by recommending admin changes to an administrator, the administrator need not necessarily spend time reviewing resources to determine which admin changes to perform and/or which admin changes to not perform. Reducing the time spent by the administrator to determine an admin change results in a reduced cost associated with the administrator. The example techniques may increase efficiency of a computing system that is used by an administrator to perform system management operations.

The example techniques may increase efficiency of an IT administrator. For example, by recommending admin change(s) to the IT administrator, the example techniques may reduce a number of steps that are performed by the IT administrator, an amount of effort that the IT administrator expends, and/or an amount of time that the IT administrator takes to oversee the system management of the enterprise.

The example techniques may increase efficiency of an end user. For example, by recommending admin change(s) to the IT administrator, the example techniques may enable the IT administrator to optimize operation of the end user's devices and/or optimize the end user's user experience based on currently available resources and configurations. It should be noted that the admin change(s) may be recommended directly to the end user (e.g., without going through the IT administrator), which may enable the end user to optimize the operation of the end user's devices and/or optimize the end user's user experience.

FIG. 1 is a block diagram of an example admin change recommendation system 100 in accordance with an embodiment. Generally speaking, admin change recommendation system 100 operates to perform system configuration operations with regard to enterprises 114A-114M. As shown in FIG. 1, the admin change recommendation system 100 includes system management server(s) 102 and the enterprises 114A-114M. Communication between the system management server(s) 102 and the enterprises 114A-114M is carried out over a network 108 using well-known network communication protocols. The network 108 may be a wide-area network (e.g., the Internet), a local area network (LAN), another type of network, or a combination thereof.

Each of the enterprises 114A-114M includes an admin system 104, a network 110, and user devices 106. For instance, a first enterprise 114A includes a first admin system 104A, a first network 110A, and first user devices 106A. A second enterprise 114B includes a second admin system 104B, a second network 110B, and second user devices 106B. An Mth admin system 104M includes an Mth admin system 104M, an Mth network 110M, and Mth user devices 106M. In each of the enterprises 114A-114M, communication between the admin system 104 and the user devices 106 is carried out over the network 110 using well-known network communication protocols. The network 110 may be a wide-area network (e.g., the Internet), a local area network (LAN), another type of network, or a combination thereof.

In each of the enterprises 114A-114M, the user devices 106 are processing systems that are capable of communicating the admin system 104. An example of a processing system is a system that includes at least one processor that is capable of manipulating data in accordance with a set of instructions. For instance, a processing system may be a computer, a personal digital assistant, etc. The user devices 106 are configured to provide requests to servers (not shown) for requesting information stored on (or otherwise accessible via) the servers. For instance, a user may initiate a request for executing a computer program (e.g., an application) using a client (e.g., a Web browser, Web crawler, or other type of client) deployed on a user device that is owned by or otherwise accessible to the user. In accordance with some example embodiments, user devices 106 are capable of accessing domains (e.g., Web sites) hosted by the servers, so that the user devices 106 may access information that is available via the domains. Such domains may include Web pages, which may be provided as hypertext markup language (HTML) documents and objects (e.g., files) that are linked therein, for example.

Each of the user devices 106 may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 106 may communicate with any one or more of the servers.

The user devices 106 are also configured to provide information to the admin system 104 automatically or in responses to inquiries from the admin system 104. For instance, such information may pertain to hardware and/or software configurations of the user devices 106 (e.g., updates thereof), workloads of the user devices 106, resource utilization on the user devices, etc.

The admin system 104 is a processing system that is capable of communicating with the user devices 106. The admin system 104 is configured to perform operations to facilitate system management of the enterprise 114 in response to instructions that are received from the IT administrator of the enterprise 114. For example, the admin system 104 may provide commands to the system management server(s) 102, indicating admin changes that are to be performed by the system management server(s) 102 to perform system management of the enterprise 114. In another example, the admin system 104 may provide requests for information to the user devices 106. The IT administrator may make decisions regarding system management of the user devices 106 and/or the network 110 based at least in part on the information that is received from the user devices 106. It will be recognized that at least some (e.g., all) of the information may be gathered by the system management server(s) 102, rather than by the admin system 104.

The system management server(s) 102 are processing systems that are capable of communicating with enterprises 114A-114M. For instance, the system management server(s) 102 may be capable of communicating with the admin system 104 and/or the user devices 106 in each enterprise 114. The system management server(s) 102 include admin change recommendation logic 112. The admin change recommendation logic 112 is configured to provide information to and/or gather information from the admin server 104 and/or the user devices 106 in each enterprise 114 for purposes of performing system management of the enterprise 114. For instance, the admin change recommendation logic 112 may push information to the user devices 106 or provide the information in response to requests that are received from the user devices 106. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint.

In accordance with example embodiments described herein, the admin change recommendation logic 112 collects information indicating admin changes made by administrators in environments of the enterprises 114A-114M and further indicating values of metrics resulting from the admin changes. The admin change recommendation logic 112 analyzes and categorizes the information into categories based at least in part on characteristic(s) of the environments in which the admin changes are made. The admin change recommendation logic 112 determines a type of intended admin change that an administrator is to perform with regard to an enterprise 114 based at least in part on an operation performed by the administrator using an enterprise management tool. For instance, the enterprise management tool may be accessible to the administrator via a client deployed on the admin system 104. The admin change recommendation logic 112 cross-references the type of the intended admin change with the information to identify subsets of the information to which the type corresponds. The admin change recommendation logic 112 infers a causal relationship between admin change(s) that were made after an admin change of the type, as indicated by the information that is in the subsets, and an increase in value(s) of respective metric(s) that are indicated by the information that is in the subsets, by analyzing the subsets, based at least in part on cross-referencing the type of the intended admin change with the information that is in the subsets. The admin change recommendation logic 112 recommends a recommended admin change, which the information in at least one subset indicates to have been made after an admin change of the type, to be performed by the administrator based at least in part on one or more categories into which the at least one subset is categorized and further based at least in part on a causal relationship between the recommended admin change and an increase in at least one of the value(s) of at least one of the respective metric(s).

It will be recognized that at least some of the aforementioned functionality may be implemented by the admin system 104, rather than by the admin change recommendation logic 112. For example, if the administrator does not want to provide information to the system management server(s) 102 and instead wishes to only receive information from the system management server(s) 102, the admin system 104 may determine a type of intended admin change that an administrator is to perform with regard to an enterprise 114 based at least in part on an operation performed by the administrator using an enterprise management tool. The admin system 104 may cross-reference the type of the intended admin change with information indicating admin changes made by administrators in respective environments of respective enterprises 114A-114M and further indicating values of metrics resulting from the admin changes to identify subsets of the information to which the type corresponds. The admin system 104 may infer a causal relationship between admin change(s) that were made after an admin change of the type, as indicated by the information that is in the subsets, and an increase in value(s) of respective metric(s) that are indicated by the information that is in the subsets, by analyzing the subsets, based at least in part on cross-referencing the type of the intended admin change with the information that is in the subsets. The admin system 104 may recommend a recommended admin change, which the information in at least one subset indicates to have been made after an admin change of the type, to be performed by the administrator based at least in part on one or more categories into which the at least one subset is categorized and further based at least in part on a causal relationship between the recommended admin change and an increase in at least one of the value(s) of at least one of the respective metric(s). In accordance with this example, the information regarding the admin changes may have been categorized into categories, including the one or more categories, by the admin change recommendation logic 112 based at least in part on characteristic(s) of the environments in which the admin changes are made. In further accordance with this example, the admin system 104 may receive the information from the admin change recommendation logic 112 in response to the information being categorized by the admin change recommendation logic 112.

The admin change recommendation logic 112 may be implemented in various ways to provide a recommendation of an admin change in an enterprise, including being implemented in hardware, software, firmware, or any combination thereof. For example, at least a portion of the admin change recommendation logic 112 may be implemented as computer program code configured to be executed in one or more processors. In another example, at least a portion of the admin change recommendation logic 112 may be implemented as hardware logic/electrical circuitry. For instance, at least a portion of the admin change recommendation logic 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The admin change recommendation logic 112 is shown to be incorporated in the system management server(s) 102 for illustrative purposes and is not intended to be limiting. It will be recognized that the admin change recommendation logic 112 (or any portion(s) thereof) may be incorporated in the admin system 104 and/or any one or more of the user devices 106. For example, client-side aspects of the admin change recommendation logic 112 may be incorporated in the admin system 104 and/or one or more of the user devices 106, and server-side aspects of the admin change recommendation logic 112 may be incorporated in the system management server(s) 102.

Figure 2:
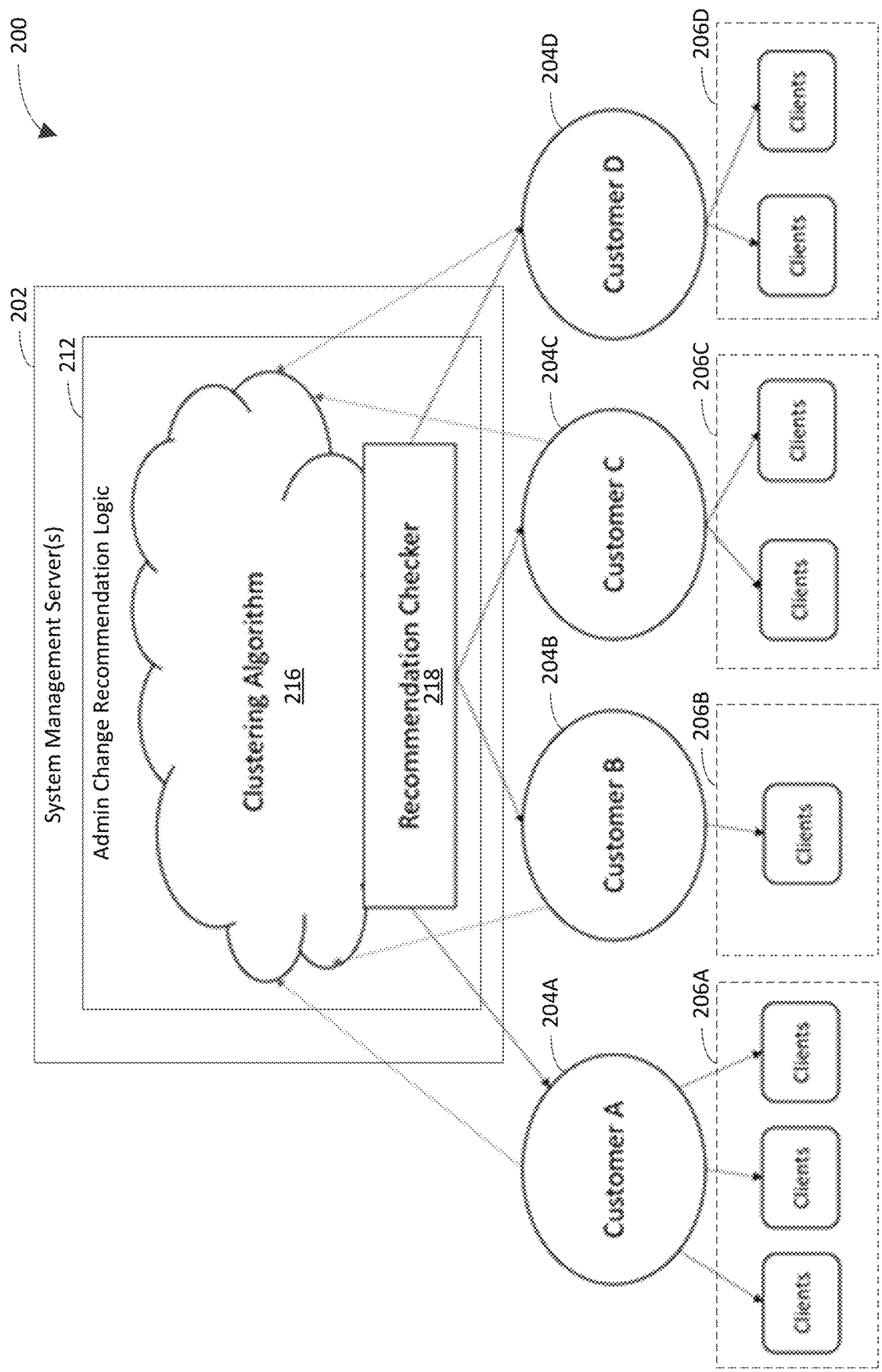
FIG. 2 is a block diagram of an example implementation of an admin change recommendation system shown in FIG. 1 in accordance with an embodiment.

FIG. 2 is a block diagram of an admin change recommendation system 200, which is an example implementation of an admin change recommendation system 100 shown in FIG. 1, in accordance with an embodiment. As shown in FIG. 2, the admin change recommendation system 200 includes system management server(s) 202, customer machines 204A-204D, and client machines 206A-206D. The system management server(s) 202 are capable of communicating with the customer machines 204A-204D and the client machines 206A-206D as described above with respect to FIG. 1. The system management server(s) 202 include admin change recommendation logic 212, which may include any of the functionality described above with respect to the admin change recommendation logic 112 of FIG. 1.

For instance, the admin change recommendation logic 212 may provide admin change recommendations in an enterprise management tool. For instance, the admin change recommendation logic 212 may collect telemetry from the customer machines 204A-204D using the enterprise management tool in regular time interval syncs. The information received from each of the client machines 204A-204D may include the type of devices in the enterprise, applications used, deployment details, update schedules, crash details, popular task sequences, and any other information for which the tool is used. Accordingly, a vast pool of data may be collected from the customer machines 204A-204D. In an example embodiment, the admin change recommendation logic 212 provides an inquiry to the customer machines 204A-204D, inquiring whether users of the customer machines 204A-204D wish to opt-in to providing such telemetry or particular aspects thereof (e.g., driver updates) to the admin change recommendation logic 212. In accordance with this embodiment, if a user of a customer machine (e.g., any of customer machines 204A-204D) opts-in to providing the telemetry or the particular aspects thereof, the admin change recommendation logic 212 collects the telemetry or the particular aspects thereof from the customer machine using the enterprise management tool. In further accordance with this embodiment, if a user of a customer machine does not opt-in to providing the telemetry or the particular aspects thereof, the admin change recommendation logic 212 does not collect the telemetry or the particular aspects thereof from the customer machine.

The admin change recommendation logic 212 includes a clustering algorithm 216 and a recommendation checker 218. The admin change recommendation logic 212 may use the clustering algorithm 216 to analyze and categorize the data according to different customer environments and preferences. The different parameters may include size of the enterprise (i.e., number of clients) along with parameters specific to the situation being evaluated. Each of the resulting (environment facing) categories may include multiple sub-categories to cover specific scenarios that an administrator may face. Then when a customer uses the enterprise management tool, the tool may evaluate the type of admin change the user would like to perform and cross-reference the type with the information from the overall pool that has been analyzed and categorized to provide a recommended admin change to the user that may ultimately be followed. If the customer decides to use the admin change, the tool may automatically populate the fields for the recommended admin change (e.g., a next best admin change) and confirm with the user (e.g., solicit approval from the user) before performing the recommended admin change.

An example data flow for providing an admin change recommendation will now be described. The customer machines 204A-204D may send data to the system management server(s) 202. The system management server(s) 202 may analyze the data that is received from the customer machines 204A-204D using the clustering algorithm 216. After the clustering algorithm generates an admin change recommendation based on the analysis of the data, the admin change recommendation may pass through the recommendation checker 218 in order to have human verification on the admin change recommendation before the admin change recommendation is sent to the customer machines 204A-204D. Once the admin change recommendation passes the recommendation checker 218, the admin change recommendation logic 212 sends the admin change recommendation to customers that would be improved by the recommended admin change. For instance, a customer may be improved by a recommended admin change by increasing performance (e.g., efficiency, speed) of the client machines associated with the customer or by increasing a statistical likelihood of such performance increasing as a result of the recommended admin change being implemented.

For example, let's consider a scenario involving software updates, specifically operating system (OS) updates. In order to create a sufficient pool of information on software updates, a wide variety of telemetry may be collected from each customer. The existing telemetry channel can be used to collect more data, such as the last update time, last update software, the boot time, central processing unit (CPU) utilization, battery utilization, number of application crashes, and network connectivity. An OS update summarization algorithm may analyze the data in order to figure out whether the update was successful. The last update software and the last update time specify how long ago and what update the customer deployed to its client machines 206A-206D. Likewise, the update time can be used to narrow the CPU and battery utilization for that particular update. The success of the update can be used by looking at application crashes and the times of the crashes. If the Windows Event Log had more crashes after the update compared to before the time of the update, then this experience may be a symptom of the update. It will be recognized that the success of an update can be measured using any suitable properties. Given this information per client for a customer, the admin change recommendation logic 212 may consider the average boot time, CPU usage, battery usage, and application crashes after the update from the client machines for that customer to represent the success of the update for that customer. These averages may be provided into a row in a summarized data table, along with characteristics specific to the customer, such as the number of clients. The same summarization may be run on all other customers who are sending telemetry, and their entries may be put into the data table.

For this situation, let's assume a new OS update came out 6 months ago and Customer A may be considering deploying this update to its client machines 206A. From the data collection, we can see that other customers have downloaded the new OS update. In order to determine the validity of the new OS update, the admin change recommendation logic 212 may take into consideration all customers that have the new update along with other parameters. For instance, the parameters may include a user score for each customer. The user score may be used as a metric to indicate whether the corresponding customer is considered healthy. The admin change recommendation logic 212 may then run the clustering algorithm 216 on the user scores and other parameters of all the customers that have downloaded this update to be able to evaluate the OS update.

The clustering algorithm 216 may perform the following steps:

1. Take the user score and values of each parameter (in this case it would be number of clients, CPU usage, battery, application crashes, boot times, etc.) from each customer.
2. Simulate all the user scores in a plot and randomly choose an N-means somewhere on the plot. N is a positive integer (e.g., 1, 2, 3, 4, 5, and so on).
3. Per customer, compute the vector distance from its "point" and all the means found.
4. Classify the customer with its closest mean.
5. Repeat steps 3-4 for each customer.
6. Recompute the means by taking the average of each set of classified customer points.
7. Repeat steps 3-6 until the means change minutely. For instance, steps 3-6 may be repeated until the means change less than a threshold amount.

The clustering algorithm 216 may indicate that customers generally are affected by the OS update and that the update can be categorized in 5 different categories. From this information, the clustering algorithm 216 may determine the mean to which customer A's parameters are closest. If the mean user score is higher than that of customer A, the clustering algorithm 216 may provide a recommendation for customer A to update.

Before this admin change recommendation is sent to the customer, the admin change recommendation may go through a level of human validation via the recommendation checker 218. The recommendation checker 218 may ensure that the admin change recommendation is valid and check the work of the clustering algorithm 216 to make sure the admin change recommendation makes sense. After passing this step, the admin change recommendation logic 212 may send a notification of the admin change recommendation to Customer A, and Customer A may have an option to deploy the update or not. It will be recognized that over time, the functionality of the recommendation checker 218 may be automated by utilizing a machine learning algorithm that observes the behavior of the recommendation checker 218 and that may eventually be able to perform the work of the recommendation checker 218 on its own.

Figure 3:
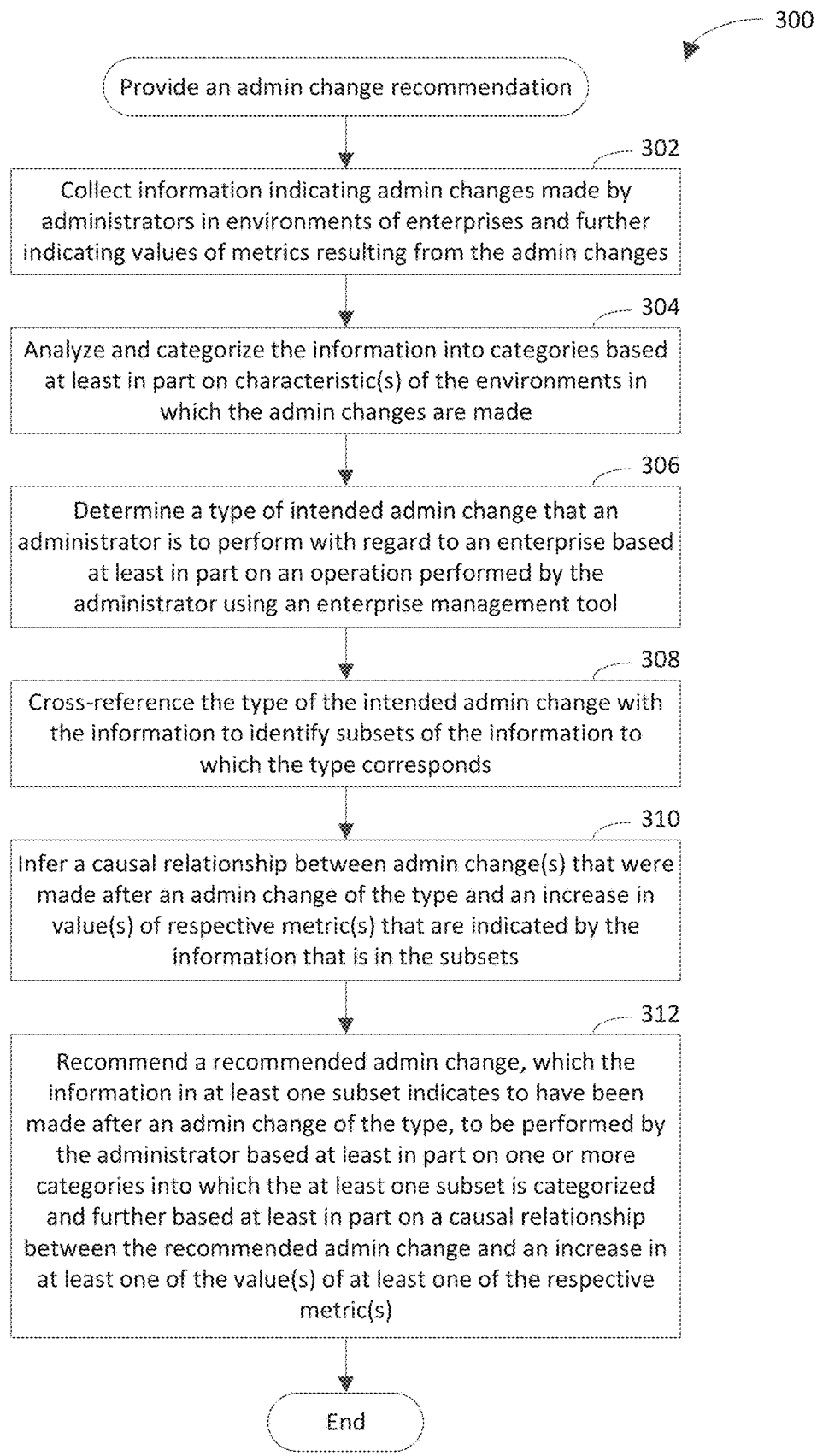
FIGS. 3-5 depict flowcharts of example methods for providing an admin change recommendation in accordance with an embodiment.
Figure 4:
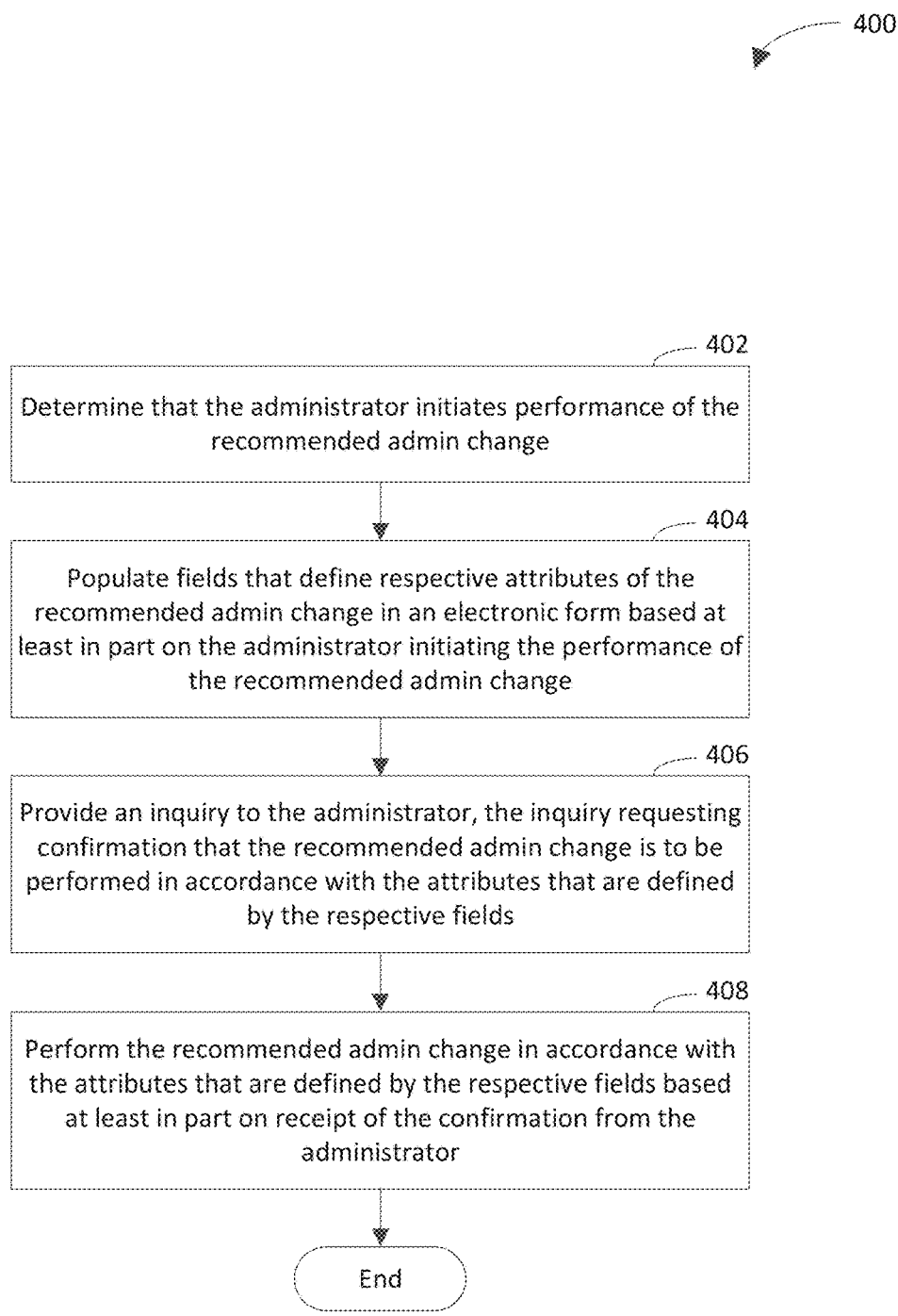
Figure 5:
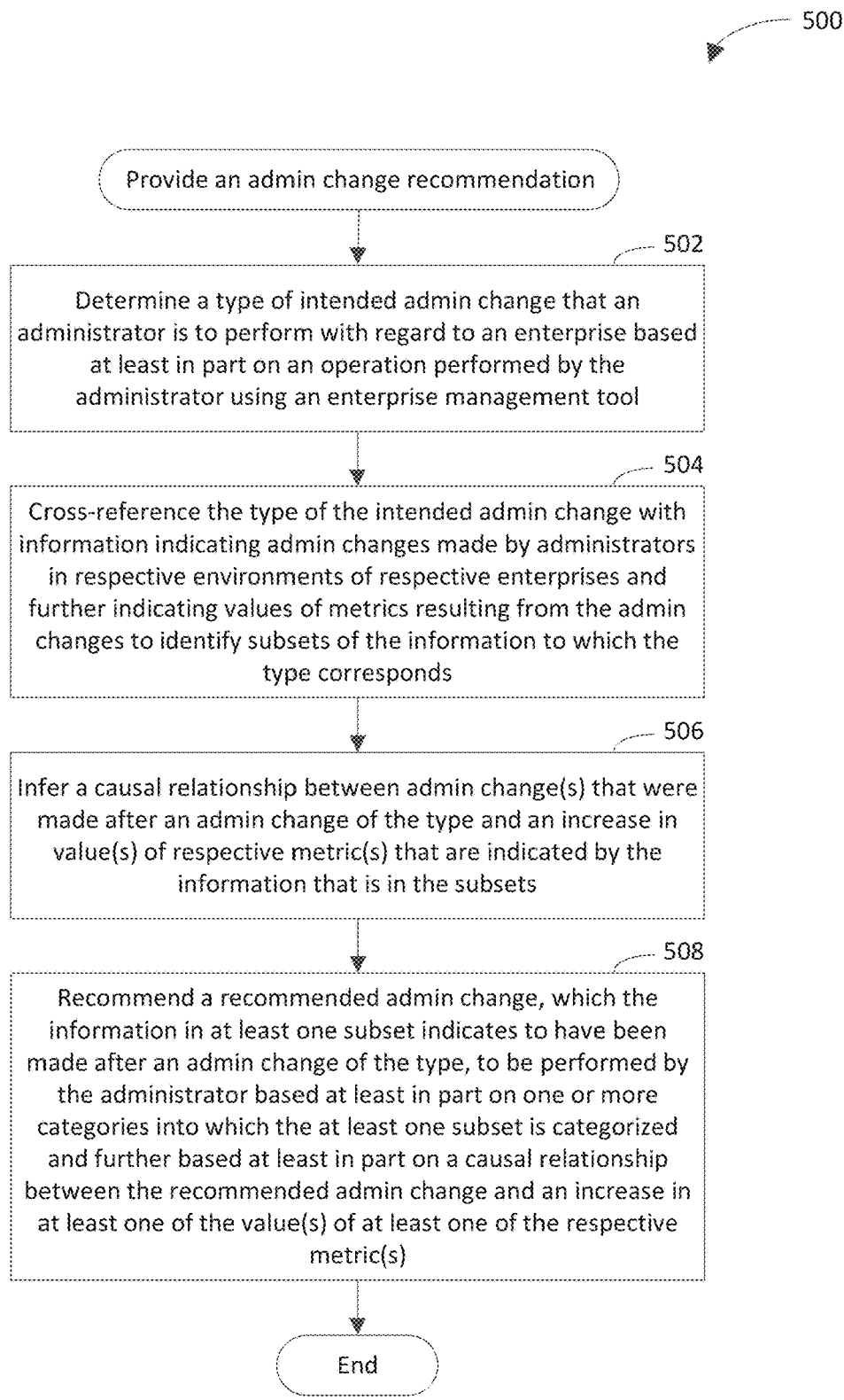
Figure 6:
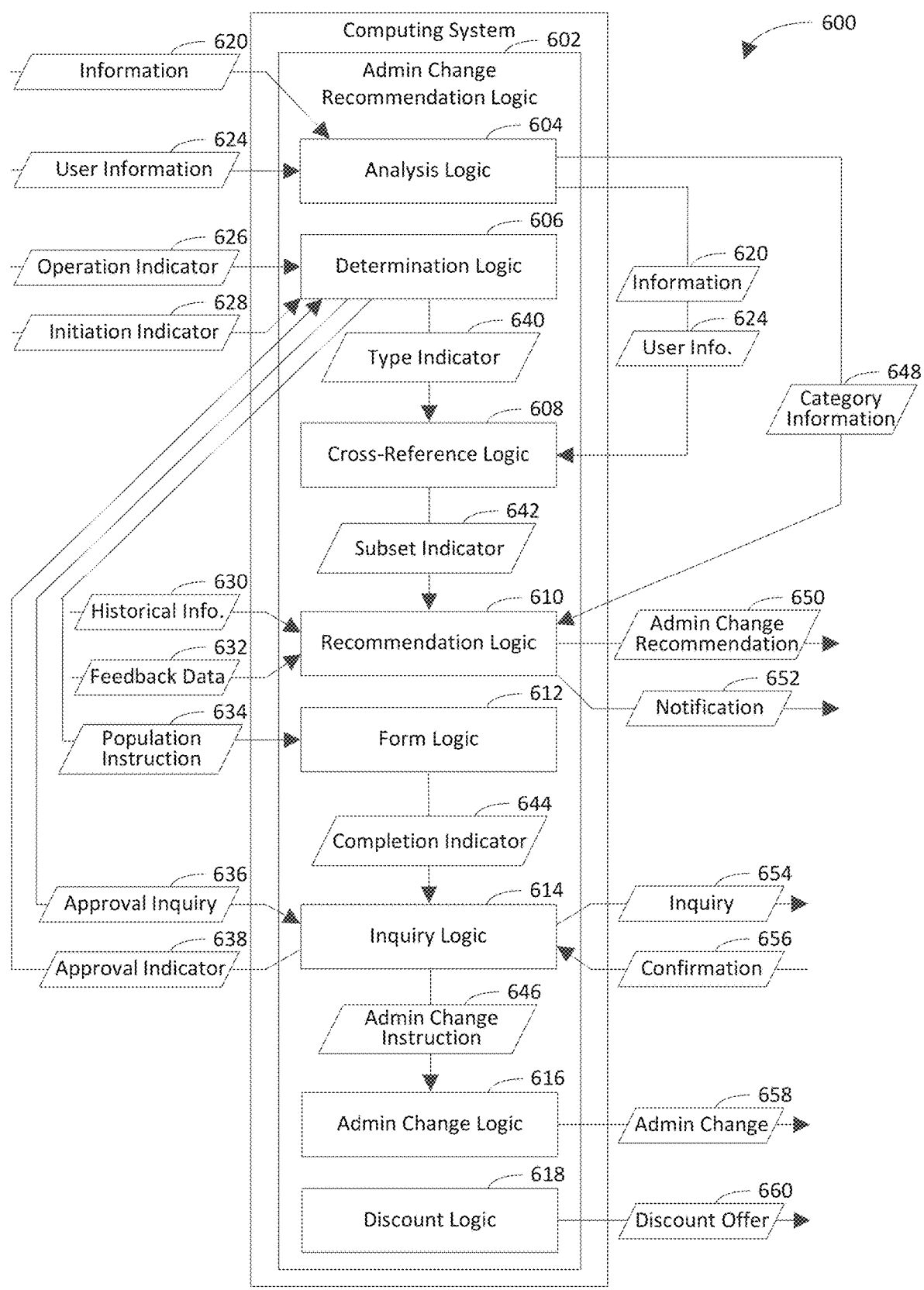
FIG. 6 is a system diagram of an exemplary computing system in accordance with an embodiment.

FIGS. 3-5 depict flowcharts 300, 400, and 500 of example methods for providing an admin change recommendation in accordance with an embodiment. Flowcharts 300, 400, and 500 may be performed by the system management server(s) 102, one of the admin systems 104A-104M, or a combination thereof, shown in FIG. 1, for example. For illustrative purposes, flowcharts 300, 400, and 500 are described with respect to computing system 600 shown in FIG. 6, which may be an example implementation of the system management server(s) 102, one of the admin systems 104A-104M, or a combination thereof. As shown in FIG. 6, the computing system 600 includes admin change recommendation logic 602. The admin change recommendation logic 602 includes analysis logic 604, determination logic 606, cross-reference logic 608, recommendation logic 610, form logic 612, inquiry logic 614, admin change logic 616, and discount logic 618. Further structural and operational embodiments will be apparent to persons skilled in the relevant art(s) based on the discussion regarding flowcharts 300, 400, and 500.

As shown in FIG. 3, the method of flowchart 300 begins at step 302. In step 302, information is collected. The information indicates admin changes made by administrators in environments of enterprises and further indicates values of metrics resulting from the admin changes. In an example implementation, the analysis logic 604 collects information 620 indicating admin changes made by administrators in environments of enterprises and further indicating values of metrics resulting from the admin changes.

At step 304, the information is analyzed and categorized into categories based at least in part on characteristic(s) of the environments in which the admin changes are made. In an example implementation, the analysis logic 604 analyzes and categorizes the information 620 into the categories. The information 620 may indicate the characteristic(s) of the environment in which the admin changes are made. Accordingly, the analysis logic 604 may extract or derive the characteristic(s) of the environments in which the admin changes are made from the information 620.

At step 306, a type of intended admin change that an administrator is to perform with regard to an enterprise is determined based at least in part on an operation performed by the administrator using an enterprise management tool. In an example implementation, the determination logic 606 determines the type of intended admin change that the administrator is to perform with regard to the enterprise. For example, the determination logic 606 may receive an operation indicator 626 that indicates the type of the intended admin change that the administrator is to perform. In accordance with this example, the determination logic 606 may determine the type of intended admin change that the administrator is to perform in response to receipt of the operation indicator 626 (e.g., based at least in part on the type indicated by the operation indicator 626). The determination logic 606 may generate a type indicator 640 to indicate the type of the admin change.

At step 308, the type of the intended admin change is cross-referenced with the information to identify subsets of the information to which the type corresponds. In an example implementation, the cross-reference logic 608 cross-references the type of the intended admin change with the information 620 to identify subsets of the information 620 to which the type corresponds. The cross-reference logic 608 may generate a subset indicator 642 to indicate the subsets of the information to which the type corresponds.

At step 310, a causal relationship is inferred between admin change(s) that were made after an admin change of the type and an increase in value(s) of respective metric(s) that are indicated by the information that is in the subsets. The information in the subset indicates the admin change(s) that were made after the admin change of the type. The causal relationship is inferred by analyzing the subsets. The causal relationship is inferred based at least in part on cross-referencing the type of the intended admin change with the information that is in the subsets. In an example implementation, the recommendation logic 610 infers the causal relationship between the admin change(s) that were made after the admin change of the type, as indicated by the information 620 that is in the subsets, and an increase in value(s) of respective metric(s) that are indicated by the information 620 that is in the subsets, by analyzing the subsets, based at least in part on cross-referencing the type of the intended admin change with the information 620 that is in the subsets. The recommendation logic 610 may extract or derive the admin change(s) that were made after the admin change of the type from the information 620 in the subset.

At step 312, a recommended admin change, which the information in at least one subset indicates to have been made after an admin change of the type, is recommended to be performed by the administrator based at least in part on one or more categories into which the at least one subset is categorized and further based at least in part on a causal relationship between the recommended admin change and an increase in at least one of the value(s) of at least one of the respective metric(s). In an example implementation, the recommendation logic 610 provides an admin change recommendation 650, which recommends the recommended admin change to be performed by the administrator, based at least in part on one or more categories into which the at least one subset is categorized and further based at least in part on a causal relationship between the recommended admin change and an increase in at least one of the value(s) of at least one of the respective metric(s). In accordance with this implementation, the information 620 in at least one subset indicates that the recommended admin change was made after an admin change of the type. The recommendation logic 610 may provide the admin change recommendation 650 in response to receipt of the category information 648 and the subset indicator 642. In accordance with this example, the recommendation logic 610 may cross-reference the categories indicated by the category information 648 with the subsets indicated by the subset indicator 642 to determine the one or more categories into which the at least one subset is categorized.

In an example embodiment, analyzing and categorizing the information at step 304 includes categorizing the information in each category into multiple sub-categories corresponding to respective tasks that are performed by the administrators in the environments. In accordance with this embodiment, recommending the recommended admin change at step 310 includes recommending the recommended admin change to be performed by the administrator further based at least in part on the sub-categories into which the subsets are categorized.

In some example embodiments, one or more steps 302, 304, 306, 308, 310, and/or 312 of flowchart 300 may not be performed. Moreover, steps in addition to or in lieu of steps 302, 304, 306, 308, 310, and/or 312 may be performed. For instance, in an example embodiment, the method of flowchart 300 further includes, for each admin change that is indicated by the information, determining an amount that a measure of an attribute associated with end users and/or devices that are targeted by the admin change changes in response to the admin change. For instance, the determination logic 606 may determine the amount that the measure of the attribute changes in response to the admin change. In accordance with this embodiment, recommending the recommended admin change at step 312 includes recommending the recommended admin change to be performed by the administrator further based at least in part on the amount that the measure of the attribute for each admin change with which the information in the subsets pertains changes.

In an aspect of this embodiment, collecting the information at step 302 includes collecting data regarding regional event(s) and/or global event(s). Each regional event impacts behavior of end users of the enterprise within a limited geographical region during a period of time in which the information is collected. Each global event impacts behavior of end users of the enterprise worldwide during the period of time in which the information is collected. In accordance with this aspect, collecting the information at step 302 further includes determining an extent to which the regional event(s) and/or the global event(s) changes the amount that the measure of the attribute changes for each admin change. For example, the information may include first information and second information. The first information may indicate a first amount that the measure changes for each admin change in absence of (e.g., prior to) the regional event(s) and the global event(s). The second information may indicate a second amount that the measure changes for each admin change in response to the regional event(s) and/or the global event(s) occurring. In accordance with this example, determining the extent at step 302 may include comparing the first amount and the second amount (e.g., subtracting the first amount from the second amount) to determine the extent. In further accordance with this aspect, recommending the recommended admin change at step 312 includes recommending the recommended admin change to be performed by the administrator further based at least in part on the extent to which the regional event(s) and/or the global event(s) changes the amount that the measure of the attribute changes for each admin change with which the information in the subsets pertains.

In another aspect of this embodiment, the method of flowchart 300 includes analyzing historical data regarding the admin changes made by the administrators to determine that a subset of parameters that are collected with regard to the admin changes is likely to contribute to changes in corresponding measures of the attribute. For example, the analysis may reveal that each parameter in the subset has led to changes in the corresponding measures of the attribute in the past. In accordance with this example, the analysis may reveal that each parameter that is not included in the subset has not led to changes in the corresponding measures of the attribute in the past. In another example, the analysis may reveal that a proportion of instances of each parameter in the subset that has led to changes in the corresponding measures of the attribute in the past is greater than or equal to a threshold proportion. In accordance with this example, the analysis may reveal that a proportion of instances of each parameter that is not included in the subset that has led to changes in the corresponding measures of the attribute in the past is less than the threshold proportion. In an example implementation, analysis logic 604 analyzes the historical data to determine that the subset of the parameters is likely to contribute to changes in corresponding measures of the attributes. For instance, the historical data may be included in the information 620. In accordance with this aspect, collecting the information at step 302 includes limiting the information that is collected to the subset of the parameters.

In another example embodiment, the method of flowchart 300 further includes, for each admin change that is indicated by the information, determining an amount that a user experience score associated with end users and/or devices that are targeted by the admin change changes in response to the admin change. The user experience score indicates a quality of a user experience associated with the end users and/or the devices. For instance, the quality of the user experience may be based at least in part on an amount of time that the end users wait for processes that run on the devices to perform operations, a frequency with which the devices (or applications running on the devices) crash, a number of errors that are encountered by the users with regard to applications that are running on the devices, etc. In an example, the information may include first information and second information. The first information may indicate, for each admin change, a first value of the respective user experience score in absence of the admin change. The second information may indicate, for each admin change, a second value of the respective user experience score in response to the admin change. In accordance with this example, for each admin change, determining the amount that the respective user experience score changes in response to the admin change may include comparing the first value and the second value (e.g., subtracting the first value from the second value) to determine the amount. For instance, the determination logic 606 may determine the amount that the user experience score changes in response to the admin change. In accordance with this embodiment, recommending the recommended admin change at step 312 includes recommending the recommended admin change to be performed by the administrator further based at least in part on the amount that the user experience score for each admin change with which the information in the subsets pertains changes.

In an aspect of this embodiment, collecting the information at step 302 includes collecting data regarding regional event(s) and/or global event(s). Each regional event impacts behavior of end users of the enterprise within a limited geographical region during a period of time in which the information is collected. Each global event impacts behavior of end users of the enterprise worldwide during the period of time in which the information is collected. In accordance with this aspect, collecting the information at step 302 further includes determining an extent to which the regional event(s) and/or the global event(s) changes the user experience score for each admin change. In further accordance with this aspect, recommending the recommended admin change at step 312 includes recommending the recommended admin change to be performed by the administrator further based at least in part on the extent to which the at least regional event(s) and/or the global event(s) changes the user experience score for each admin change with which the information in the subsets pertains.

In another aspect of this embodiment, the method of flowchart 300 includes analyzing historical data regarding the admin changes made by the administrators to determine that a subset of parameters that are collected with regard to the admin changes is likely to contribute to changes in corresponding user experience scores. For example, the analysis may reveal that each parameter in the subset has led to changes in the corresponding user experience scores in the past. In accordance with this example, the analysis may reveal that each parameter that is not included in the subset has not led to changes in the corresponding user experience scores in the past. In another example, the analysis may reveal that a proportion of instances of each parameter in the subset that has led to changes in the corresponding user experience scores in the past is greater than or equal to a threshold proportion. In accordance with this example, the analysis may reveal that a proportion of instances of each parameter that is not included in the subset that has led to changes in the corresponding user experience scores in the past is less than the threshold proportion. In an example implementation, analysis logic 604 analyzes the historical data to determine that the subset of the parameters that are collected with regard to the admin changes is likely to contribute to changes in corresponding user experience scores. In accordance with this aspect, collecting the information at step 302 includes limiting the information that is collected to the subset of the parameters.

In yet another example embodiment, the method of flowchart 300 further includes, for each admin change that is indicated by the information, determining an amount that end user productivity of end users who are targeted by the admin change changes in response to the admin change. In an example, the information may include first information and second information. The first information may indicate, for each admin change, a first amount of end user productivity of the end users prior to the admin change. The second information may indicate, for each admin change, a second amount of end user productivity of the end users in response to the admin change. In accordance with this example, for each admin change, determining the amount that end user productivity of the end users changes in response to the admin change may include comparing the first value and the second value (e.g., subtracting the first value from the second value) to determine the amount. For instance, the determination logic 606 may determine the amount that end user productivity of the end users who are targeted by the admin change changes in response to the admin change. In accordance with this embodiment, recommending the recommended admin change at step 312 includes recommending the recommended admin change to be performed by the administrator further based at least in part on the amount that the end user productivity for each admin change with which the information in the subsets pertains changes.

In an aspect of this embodiment, collecting the information at step 302 includes collecting data regarding regional event(s) and/or global event(s). Each regional event impacts behavior of end users of the enterprise within a limited geographical region during a period of time in which the information is collected. Each global event impacts behavior of end users of the enterprise worldwide during the period of time in which the information is collected. In accordance with this aspect, collecting the information at step 302 further includes determining an extent to which the regional event(s) and/or the global event(s) changes the end user productivity for each admin change. For example, the information may include first information and second information. The first information may indicate a first amount of end user productivity for each admin change in absence of (e.g., prior to) the regional event(s) and the global event(s). The second information may indicate a second amount of end user productivity for each admin change in response to the regional event(s) and/or the global event(s) occurring. In accordance with this example, determining the extent to which the regional event(s) and/or the global event(s) changes the end user productivity for each admin change may include comparing the first amount and the second amount (e.g., subtracting the first amount from the second amount) to determine the extent. In further accordance with this aspect, recommending the recommended admin change at step 312 includes recommending the recommended admin change to be performed by the administrator further based at least in part on the extent to which the regional event(s) and/or the global event(s) changes the end user productivity for each admin change with which the information in the subsets pertains.

In another aspect of this embodiment, the method of flowchart 300 includes analyzing historical data regarding the admin changes made by the administrators to determine that a subset of parameters that are collected with regard to the admin changes is likely to contribute to changes in corresponding productivities. For example, the analysis may reveal that each parameter in the subset has led to changes in the corresponding productivities in the past. In accordance with this example, the analysis may reveal that each parameter that is not included in the subset has not led to changes in the corresponding productivities in the past. In another example, the analysis may reveal that a proportion of instances of each parameter in the subset that has led to changes in the corresponding productivities in the past is greater than or equal to a threshold proportion. In accordance with this example, the analysis may reveal that a proportion of instances of each parameter that is not included in the subset that has led to changes in the corresponding productivities in the past is less than the threshold proportion. In an example implementation, analysis logic 604 analyzes the historical data regarding the admin changes made by the administrators to determine that the subset of the parameters that are collected with regard to the admin changes is likely to contribute to changes in corresponding productivities. In accordance with this aspect, collecting the information at step 302 includes limiting the information that is collected to the subset of the parameters.

In still another example embodiment, the method of flowchart 300 further includes, for each admin change that is indicated by the information, determining an extent to which security of devices that are targeted by the admin change changes in response to the admin change. For example, the information may include first information and second information. The first information may indicate, for each admin change, a first amount of security experienced by the devices in absence of (e.g., prior to) the admin change. The second information may indicate, for each admin change, a second amount of security experienced by the devices in response to the admin change occurring. In accordance with this example, determining the extent to which the security of the devices changes in response to the admin change may include comparing the first amount and the second amount (e.g., subtracting the first amount from the second amount) to determine the extent. For instance, the determination logic 606 may determine the extent to which the security of the devices that are targeted by the admin change changes in response to the admin change. In accordance with this embodiment, recommending the recommended admin change at step 312 includes recommending the recommended admin change to be performed by the administrator further based at least in part on the extent to which the security changes for each admin change with which the information in the subsets pertains.

In an aspect of this embodiment, collecting the information at step 302 includes collecting data regarding regional event(s) and/or global event(s). Each regional event impacts behavior of end users of the enterprise within a limited geographical region during a period of time in which the information is collected. Each global event impacts behavior of end users of the enterprise worldwide during the period of time in which the information is collected. In accordance with this aspect, collecting the information at step 302 further includes determining an extent to which the regional event(s) and/or the global event(s) changes the security for each admin change. In further accordance with this aspect, recommending the recommended admin change at step 312 includes recommending the recommended admin change to be performed by the administrator further based at least in part on the extent to which the regional event(s) and/or the global event(s) changes the security for each admin change with which the information in the subsets pertains.

In another aspect of this embodiment, the method of flowchart 300 includes analyzing historical data regarding the admin changes made by the administrators to determine that a subset of parameters that are collected with regard to the admin changes is likely to contribute to changes in device security. For example, the analysis may reveal that each parameter in the subset has led to changes in device security in the past. In accordance with this example, the analysis may reveal that each parameter that is not included in the subset has not led to changes in device security in the past. In another example, the analysis may reveal that a proportion of instances of each parameter in the subset that has led to changes in device security in the past is greater than or equal to a threshold proportion. In accordance with this example, the analysis may reveal that a proportion of instances of each parameter that is not included in the subset that has led to changes in device security in the past is less than the threshold proportion. In an example implementation, analysis logic 604 analyzes the historical data regarding the admin changes made by the administrators to determine that the subset of the parameters that are collected with regard to the admin changes is likely to contribute to changes in device security. In accordance with this aspect, collecting the information at step 302 includes limiting the information that is collected to the subset of the parameters.

In another example embodiment, the method of flowchart 300 further includes determining that a human has approved recommendation of the recommended admin change to be performed by the administrator. For example, the determination logic 606 may determine that a human has approved recommendation of the recommended admin change. In accordance with this example, the determination logic 606 may provide an approval inquiry 636 to the inquiry logic 614. The approval inquiry 636 may request an indication as to whether a human has approved the recommendation of the recommended admin change. The inquiry logic 614 may generate an inquiry 654 in response to receiving the approval inquiry 636. The inquiry 654 may solicit confirmation from a human as to whether the human has approved the recommendation of the recommended admin change. The inquiry logic 614 may receive a confirmation 656, confirming that the recommendation of the recommended admin change has been approved by the human. The inquiry logic 614 may generate an approval indicator 638 to indicate that the recommendation of the recommended admin change has been approved by the human based at least in part on receipt of the confirmation 656. The determination logic 606 may determine that the human has approved the recommendation of the recommended admin change based at least in part on the approval indicator 638 indicating the same. In accordance with this embodiment, recommending the recommended admin change at step 312 includes recommending the recommended admin change to be performed by the administrator further based at least in part on a determination that the human has approved the recommendation of the recommended admin change to be performed by the administrator.

In yet another example embodiment, the method of flowchart 300 further includes collecting historical ratings data that indicates changes in ratings of applications, which result from updates to the applications, from a rating system that is external to the enterprise. For example, the analysis logic 604 may collect the historical ratings data. In accordance with this example, the information 620 may include the historical ratings data. In accordance with this embodiment, recommending the recommended admin change at step 312 includes recommending the recommended admin change to be performed by the administrator further based at least in part on the historical ratings data. For instance, the historical ratings data may be included in historical information 630.

In still another example embodiment, the method of flowchart 300 further includes collecting feedback data that indicates ratings of previous recommended admin changes. Each rating is received from an administrator who received a recommendation to perform the respective previous recommended admin change. Each rating indicates a quality of a user experience that resulted from performance of the respective previous recommended admin change in response to receipt of the recommendation. For example, the analysis logic 604 may collect feedback data 632, which may indicate the ratings of the previous recommended admin changes. In accordance with this example, the information 620 may include the feedback data 632. The analytics logic 604 may provide the feedback data 632 to the recommendation logic 610, though the example embodiments are not limited in this respect. In accordance with this embodiment, recommending the recommended admin change at step 312 includes recommending the recommended admin change to be performed by the administrator further based at least in part on the ratings of the previous recommended admin changes.

In another example embodiment, the method of flowchart 300 further includes collecting feedback data that indicates whether previous recommended admin changes were performed by administrators in response to receipt of recommendations to perform the previous recommended admin changes. For example, the analysis logic 604 may collect feedback data 632, which may indicate whether the previous recommended admin changes were performed by the administrators. In accordance with this example, the information 620 may include the feedback data 632. The analytics logic 604 may provide the feedback data 632 to the recommendation logic 610, though the example embodiments are not limited in this respect. In accordance with this embodiment, recommending the recommended admin change at step 312 includes recommending the recommended admin change to be performed by the administrator further based at least in part on whether the previous recommended admin changes were performed by the administrators in response to receipt of the recommendations.

In yet another example embodiment, the method of flowchart 300 further includes determining a proportion of the administrators, who have received recommendations to perform the recommended admin change, who have performed the recommended admin change. For instance, if ten administrators receive recommendations to perform the recommended admin change, and two of the ten administrators perform the recommended admin change, the proportion would be $2/10 = 1/5$. The aforementioned numbers are provided for non-limiting, illustrative purposes. For example, the determination logic 606 may determine the proportion of the administrators. In accordance with this example, the determination logic 606 may monitor whether the administrators perform the recommended admin change to determine the proportion. In accordance with this example, the historical information 630 may indicate the proportion of the administrators. In accordance with this embodiment, the method of flowchart 300 further includes notifying the administrator of the proportion of the administrators who have performed the recommended admin change. For instance, the recommendation logic 610 may provide a notification 652 to notify the administrator of the proportion.

In an aspect of this embodiment, the method of flowchart 300 further includes determining whether the proportion of the administrators who have performed the recommended admin change is greater than or equal to a threshold. For instance, the determination logic 606 may determine whether the proportion of the administrators who have performed the recommended admin change is greater than or equal to a threshold. In accordance with this aspect, notifying the administrator of the proportion of the administrators who have performed the recommended admin change includes notifying the administrator of the proportion of the administrators who have performed the recommended admin change based at least in part on a determination that the proportion is greater than or equal to the threshold.

In still another example embodiment, the method of flowchart 300 further includes analyzing recommendations of recommended admin changes that are made to the administrators and intended admin changes and categories of information on which the recommendations of the recommended admin changes are based using a machine learning (ML) technique to determine the recommended admin change to be recommended. For instance, the analysis logic 604 may analyze the historical information 630, which may indicate the recommendations and the intended admin changes and the categories of information, using the machine learning technique to determine the recommended admin change to be recommended.

In some example embodiments, the analysis logic 604 uses a neural network to perform the machine learning. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the analysis logic 604 employs a feed forward neural network to train a machine learning model that is used to determine ML-based confidences. Such ML-based confidences may be used to determine likelihoods that events will occur.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network may be capable of storing the information 620 over time. For instance, the LSTM neural network may generate a recommendation model by utilizing such information. In another example, the LSTM neural network may be capable of remembering relationships between admin changes, metrics (e.g., before and/or after the admin changes occur), categories of information, characteristics of environments in which the admin changes are made, types of admin changes, recommended admin changes, and ML-based confidences that are derived therefrom.

The analysis logic 604 may include training logic and inference logic. The training logic is configured to train a machine learning algorithm that the inference logic uses to determine (e.g., infer) the ML-based confidences. For instance, the training logic may provide sample admin changes, sample metrics, sample categories of information, sample characteristics of environments in which the admin changes are made, sample types of admin changes, sample recommended admin changes, and sample confidences as inputs to the algorithm to train the algorithm. The sample data may be labeled. The machine learning algorithm may be configured to derive relationships between the admin changes, the metrics, the categories of information, the characteristics of environments in which the admin changes are made, the types of admin changes, the recommended admin changes, and the resulting ML-based confidences. The inference logic is configured to utilize the machine learning algorithm, which is trained by the training logic, to determine the ML-based confidence when the admin changes, the metrics, the categories of information, the characteristics of environments in which the admin changes are made, the types of admin changes, the recommended admin changes are provided as inputs to the algorithm.

In another example embodiment, the method of flowchart 300 further includes collecting user information regarding user changes made on respective client devices of respective end users in the enterprise based at least in part on instructions from the respective end users. Each instruction indicates that the respective change is to be made on the respective client device. For example, the analysis logic 604 may collect user information 624 regarding the user changes. In accordance with this embodiment, the method of flowchart 300 further includes analyzing and categorizing the user information into the categories based at least in part on characteristic(s) of the environment in which the user changes are made. For instance, the analysis logic 604 may analyze and categorize the user information 624 into the categories. In further accordance with this embodiment, cross-referencing the type of the intended admin change with the information at step 308 includes cross-referencing the type of the intended admin change with the information and the user information to identify the subsets to which the type corresponds.

In yet another example embodiment, the method of flowchart 300 further includes one or more of the steps shown in flowchart 400 of FIG. 4. As shown in FIG. 4, the method of flowchart 400 begins at step 402. In step 402, a determination is made that the administrator initiates performance of the recommended admin change. For example, the determination logic 606 may determine that the administrator initiates the performance of the recommended admin change. In accordance with this example, the determination logic 606 may make the determination in response to an initiation indicator 628 (e.g., based at least in part on the initiation indicator 628 indicating that the administrator initiates the performance of the recommended admin change. In further accordance with this example, the determination logic 606 may generation a population instruction 634 in response to determining that the administrator initiates the performance of the recommended admin change.

At step 404, fields that define respective attributes of the recommended admin change are populated in an electronic form based at least in part on a determination that the administrator initiates the performance of the recommended admin change. For example, the form logic 612 may populate the fields in the electronic form. In accordance with this example, the form logic 612 may populate the fields in response to receipt of the population instruction 634. In further accordance with this example, the form logic 612 may generate a completion indicator 644 in response to the fields being populated. The completion indicator 644 indicates that population of the fields in the electronic form has been completed.

At step 406, an inquiry is provided to the administrator. The inquiry requests confirmation that the recommended admin change is to be performed in accordance with the attributes that are defined by the respective fields. For example, the inquiry logic 614 may provide an inquiry 654 to the administrator. In accordance with this example, the inquiry 654 may request confirmation that the recommended admin change is to be performed in accordance with the attributes that are defined by the respective fields. In further accordance with this example, the inquiry logic 614 may provide the inquiry 654 to the administrator in response to receipt of the completion indicator 644 (e.g., based at least in part on the completion indicator indicating that that population of the fields in the electronic form has been completed.

At step 408, the recommended admin change is performed in accordance with the attributes that are defined by the respective fields based at least in part on receipt of the confirmation from the administrator. For example, the admin change logic 616 may perform the admin change 658 in accordance with the attributes based at least in part on receipt of the confirmation. In accordance with this example, the inquiry logic 614 may receive a confirmation 656 from the administrator, confirming that the recommended admin change is to be performed in accordance with the attributes that are defined by the respective fields. For instance, the inquiry logic 614 may receive the confirmation 656 in response to the inquiry 654. In further accordance with this example, the inquiry logic 614 may generate an admin change instruction 646 in response to receipt of the confirmation 656. For instance, receipt of the confirmation 656 may trigger generation of the admin change instruction 646. In further accordance with this example, the admin change logic 616 may perform the admin change 658 in response to receipt of the admin change instruction 646 (e.g., based at least in part on receipt of the admin change instruction 646).

As shown in FIG. 5, the method of flowchart 500 begins at step 502. In step 502, a type of intended admin change that an administrator is to perform with regard to an enterprise is determined based at least in part on an operation performed by the administrator using an enterprise management tool. In an example implementation, the determination logic 606 determines the type of the intended admin change based at least in part on the operation performed by the administrator. For example, the determination logic 606 may determine the type of the intended admin change in response to receipt of the operation indicator 626. In accordance with this example, the operation indicator 626 may indicate the type of the intended admin change.

At step 504, the type of the intended admin change is cross-referenced with information indicating admin changes made by administrators in respective environments of respective enterprises and further indicating values of metrics resulting from the admin changes to identify subsets of the information to which the type corresponds. In an example implementation, the cross-reference logic 608 cross-references the type of the intended admin change with the information 620 indicating the admin changes made by the administrators in respective environments of the respective enterprises and further indicating the values of the metrics resulting from the admin changes to identify subsets of the information 620 to which the type corresponds. The cross-reference logic 608 may generate a subset indicator 642 to indicate the subsets of the information to 620 which the type corresponds.

At step 506, a causal relationship is inferred between admin change(s) that were made after an admin change of the type and an increase in value(s) of respective metric(s) that are indicated by the information that is in the subsets. The information in the subsets indicates the admin change(s) that were made after the admin change of the type. The causal relationship is inferred by analyzing the subsets. The causal relationship is inferred based at least in part on cross-referencing the type of the intended admin change with the information that is in the subsets. In an example implementation, the recommendation logic 610 infers the causal relationship between the admin change(s) that were made after the admin change of the type, as indicated by the information 620 that is in the subsets, and an increase in value(s) of respective metric(s) that are indicated by the information 620 that is in the subsets, by analyzing the subsets, based at least in part on cross-referencing the type of the intended admin change with the information 620 that is in the subsets. The recommendation logic 610 may extract or derive the admin change(s) that were made after the admin change of the type from the information 620 in the subsets.

At step 508, a recommended admin change, which the information in at least one subset indicates to have been made after an admin change of the type, is recommended to be performed by the administrator based at least in part on one or more categories into which the at least one subset is categorized and further based at least in part on a causal relationship between the recommended admin change and an increase in at least one of the value(s) of at least one of the respective metric(s). The information is categorized into categories, including the one or more categories, based at least in part on characteristic(s) of the environments in which the admin changes are made. In an example implementation, the recommendation logic 610 provides an admin change recommendation 650, which recommends the recommended admin change to be performed by the administrator, based at least in part on the one or more categories into which the at least one subset is categorized and further based at least in part on the causal relationship between the recommended admin change and the increase in at least one of the value(s) of at least one of the respective metric(s). The information 620 in at least one subset indicates that the recommended admin change was made after an admin change of the type. The information 620 may indicate the characteristic(s) of the environments in which the admin changes are made. The analysis logic 604 may extract or derive the characteristic(s) of the environments in which the admin changes are made from the information 620. The analysis logic 604 may categorize the information 620 into the categories based at least in part on the characteristic(s). The analysis logic 604 may generate category information 648 to indicate (e.g., specify) the categories. The recommendation logic 610 may provide the admin change recommendation 650 in response to receipt of the category information 648 and the subset indicator 642. For instance, the recommendation logic 610 may cross-reference the categories indicated by the category information 648 with the subsets indicated by the subset indicator 642 to determine the one or more categories into which the at least one subset is categorized.

In some example embodiments, one or more steps 502, 504, 506, and/or 508 of flowchart 500 may not be performed. Moreover, steps in addition to or in lieu of steps 502, 504, 506, and/or 508 may be performed. For instance, in an example embodiment, recommending the recommended admin change at step 508 includes recommending the recommended admin change via an admin change recommendation service that is configured to provide the admin change recommendation to the administrator. In accordance with this embodiment, the method of flowchart 500 further includes offering a discount on a cost of using the admin change recommendation service to the administrator. The discount is contingent on the administrator allowing information regarding admin changes made by the administrator to be collected for purposes of contributing to the information regarding the admin changes made by the administrators in the respective environments of the respective enterprises. For instance, the discount logic 618 may provide a discount offer 660 to the administrator. The discount offer 660 offers the discount on the cost of using the admin change recommendation service with a contingency that the administrator allows the information regarding the admin changes made by the administrator to be collected for purposes of contributing to the information 620 regarding the admin changes made by the administrators.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

The user scores and user experience scores described herein may be determined in accordance with techniques described with regard to usability scores in U.S. patent application Ser. No. 16/389,909 (hereinafter "the '909 application"), filed on Apr. 19, 2019, which is incorporated herein by reference in its entirety. For instance, the user scores and user experience scores may be determined by performing a weighted calculation on collected information (e.g., information received from user devices). It will be recognized that the techniques described in the '909 application may be expanded to take into consideration any one or more of the factors mentioned herein, in addition to or in lieu of any one or more of the factors mentioned in the '909 application, for determining the user scores and user experience scores. For instance, the '909 application mentions the following example factors:

system boot time by phase (including core boot time);
 login time by phase;
 application startup time (e.g., the time from when an application launches to when the user is able to interact with the application);
 total duration and number of times a processor utilization exceeds a threshold;
 total duration and number of times a memory utilization exceeds a threshold;
 total duration and number of times a memory I/O operation exceeds a threshold;
 total duration and number of times a network I/O operation exceeds a threshold;
 storage utilization;
 user device utilization (e.g., the number of hours a user device is on and a user is interacting with the device);
 battery utilization;
 health indicators: frequency and count of unexpected reboots, anticipated battery life, anticipated hard drive life, driver and/or application crash frequency and count.

Figure 7:
FIG. 7 shows example pseudocode for calculating user scores and user experience scores in accordance with an embodiment.

FIG. 7 shows example pseudocode 700 for calculating (e.g., determining) user scores and user experience scores in accordance with an embodiment. For instance, a user score or user experience score may represent user experience on a particular device. In some examples, user scores and user experience scores range from 0 and 100, with 100 being the best experience, and 0 being the worst. For example, if startup time is above average (e.g., longer than an average startup time on the particular device), the user may perceive a poor experience, whereas, a faster-than-average startup time will provide the user with a better experience. The pseudocode 700 may rely on normalized metrics data (e.g., when the collected information is converted into metric data, "better" values are converted into lower metric numbers). In some examples, the metric data includes instance data for particular devices (e.g., core boot time is 5 seconds); global means (e.g., average core boot time is 10 seconds); and global standard deviation (e.g., the standard deviation of boot times for all devices is 2.1 seconds). Weights that are applied to the metric data indicate the significance of a metric for users' perceptions of the experiences with the computing devices. In some example calculations, the weights sum to 1.0. For example, with three metrics, the weights may be boot time=0.1, application start time=0.4, and battery life=0.5.

The specific calculation is shown in pseudocode 700 and repeated below. The ue_score is the user score or user experience score.

```
ue_score = 0;
for each metric
    {
    z_score = min(5, max(−5,( instance − mean ) / standard deviation ));
    metric_value = (−1*<z_score> + 5/10);
    ue_score += metric_value * metric_weight;
    }
next metric;
return ue_score;
```

Some examples use alternative calculations of user scores and user experience scores. For example, instead of a linear association between z-score and user experience (ue_score), an exponential relationship may be used (e.g., twice as slow worsens the usability score by a factor of four). In another example, an expectation of a time (boot time or application startup time), rather than a calculated mean, may be used. Using an expectation of time would reduce user scores and user experience scores for computing devices that took longer than a user's expectation to perform a task, even if the particular computing device is performing at an above-average speed. Other variations are also possible.

Any one or more of admin change recommendation logic 112, admin change recommendation logic 602, analysis logic 604, determination logic 606, cross-reference logic 608, recommendation logic 610, form logic 612, inquiry logic 614, admin change logic 616, discount logic 618, flowchart 300, flowchart 400, and/or flowchart 500 may be implemented in hardware, software, firmware, or any combination thereof.

For example, any one or more of admin change recommendation logic 112, admin change recommendation logic 602, analysis logic 604, determination logic 606, cross-reference logic 608, recommendation logic 610, form logic 612, inquiry logic 614, admin change logic 616, discount logic 618, flowchart 300, flowchart 400, and/or flowchart 500 may be implemented, at least in part, as computer program code configured to be executed in one or more processors.

In another example, any one or more of admin change recommendation logic 112, admin change recommendation logic 602, analysis logic 604, determination logic 606, cross-reference logic 608, recommendation logic 610, form logic 612, inquiry logic 614, admin change logic 616, discount logic 618, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to provide an admin change recommendation comprises a memory and one or more processors coupled to the memory. The one or more processors are configured to collect information indicating admin changes made by administrators in environments of enterprises and further indicating values of metrics resulting from the admin changes. The one or more processors are further configured to analyze and categorize the information into a plurality of categories based at least in part on one or more characteristics of the environments in which the admin changes are made. The one or more processors are further configured to determine a type of intended admin change that an administrator is to perform with regard to an enterprise based at least in part on an operation performed by the administrator using an enterprise management tool. The one or more processors are further configured to cross-reference the type of the intended admin change with the information to identify a plurality of subsets of the information to which the type corresponds. The one or more processors are further configured to infer a causal relationship between one or more admin changes that were made after an admin change of the type, as indicated by the information that is in the subsets, and an increase in one or more values of one or more respective metrics that are indicated by the information that is in the subsets, by analyzing the subsets, based at least in part on cross-referencing the type of the intended admin change with the information that is in the subsets. The one or more processors are further configured to recommend a recommended admin change, which the information in at least one of the subsets indicates to have been made after an admin change of the type, to be performed by the administrator based at least in part on one or more categories into which the at least one of the subsets is categorized and further based at least in part on a causal relationship between the recommended admin change and an increase in at least one of the one or more values of at least one of the one or more respective metrics.

In a first aspect of the example system, the one or more processors are configured to, for each admin change that is indicated by the information, determine an amount that a measure of an attribute associated with at least one of a plurality of end users or a plurality of devices that are targeted by the admin change changes in response to the admin change. In accordance with the first aspect, the one or more processors are configured to recommend the recommended admin change to be performed by the administrator further based at least in part on the amount that the measure of the attribute for each admin change with which the information in the subsets pertains changes.

In a first implementation of the first aspect of the example system, the one or more processors are configured to collect data regarding at least one of one or more regional events or one or more global events. Each regional event impacts behavior of end users of the enterprise within a limited geographical region during a period of time in which the information is collected. Each global event impacts behavior of end users of the enterprise worldwide during the period of time in which the information is collected. In accordance with the first implementation, the one or more processors are configured to determine an extent to which the at least one of the one or more regional events or the one or more global events changes the amount that the measure of the attribute changes for each admin change. In further accordance with the first implementation, the one or more processors are configured to recommend the recommended admin change to be performed by the administrator further based at least in part on the extent to which the at least one of the one or more regional events or the one or more global events changes the amount that the measure of the attribute changes for each admin change with which the information in the subsets pertains.

In a second implementation of the first aspect of the example system, the one or more processors are configured to analyze historical data regarding the admin changes made by the administrators to determine that a subset of a plurality of parameters that are collected with regard to the admin changes is likely to contribute to changes in corresponding measures of the attribute. In accordance with the second implementation, the one or more processors are configured to limit the information that is collected to the subset of the plurality of parameters.

In a third implementation of the first aspect of the example system, the amount that the measure of the attribute associated with at least one of the plurality of end users or the plurality of devices that are targeted by the admin change changes comprises at least one of: an amount that a user experience score associated with at least one of the plurality of end users or the plurality of devices that are targeted by the admin change changes, the user experience score indicating a quality of a user experience associated with the at least one of the plurality of end users or the plurality of devices; an amount that end user productivity of the plurality of end users who are targeted by the admin change changes; or an extent to which security of the plurality of devices that are targeted by the admin change changes.

In a second aspect of the example system, the one or more processors are configured to categorize the information in each category into a plurality of sub-categories corresponding to a plurality of respective tasks that are performed by the administrators in the environments. In accordance with the second aspect, the one or more processors are configured to recommend the recommended admin change to be performed by the administrator further based at least in part on the sub-categories into which the subsets are categorized. The second aspect of the example system may be implemented in combination with the first aspect of the example system, though the example embodiments are not limited in this respect.

In a third aspect of the example system, the one or more processors are configured to determine whether a human has approved recommendation of the recommended admin change to be performed by the administrator. In accordance with the third aspect, the one or more processors are configured to recommend the recommended admin change to be performed by the administrator further based at least in part on a determination that the human has approved the recommendation of the recommended admin change to be performed by the administrator. The third aspect of the example system may be implemented in combination with the first and/or second aspect of the example system, though the example embodiments are not limited in this respect.

In a fourth aspect of the example system, the one or more processors are configured to collect historical ratings data that indicates changes in ratings of applications, which result from updates to the applications, from a rating system that is external to the enterprise. In accordance with the fourth aspect, the one or more processors are configured to recommend the recommended admin change to be performed by the administrator further based at least in part on the historical ratings data. The fourth aspect of the example system may be implemented in combination with the first, second, and/or third aspect of the example system, though the example embodiments are not limited in this respect.

In a fifth aspect of the example system, the one or more processors are configured to collect feedback data that indicates ratings of previous recommended admin changes. Each rating is received from an administrator who received a recommendation to perform the respective previous recommended admin change. Each rating indicates a quality of a user experience that resulted from performance of the respective previous recommended admin change in response to receipt of the recommendation. In accordance with the fifth aspect, the one or more processors are configured to recommend the recommended admin change to be performed by the administrator further based at least in part on the ratings of the previous recommended admin changes. The fifth aspect of the example system may be implemented in combination with the first, second, third, and/or fourth aspect of the example system, though the example embodiments are not limited in this respect.

In a sixth aspect of the example system, the one or more processors are configured to collect feedback data that indicates whether previous recommended admin changes were performed by administrators in response to receipt of recommendations to perform the previous recommended admin changes. In accordance with the sixth aspect, the one or more processors are configured to recommend the recommended admin change to be performed by the administrator further based at least in part on whether the previous recommended admin changes were performed by the administrators in response to receipt of the recommendations. The sixth aspect of the example system may be implemented in combination with the first, second, third, fourth, and/or fifth aspect of the example system, though the example embodiments are not limited in this respect.

In a seventh aspect of the example system, the one or more processors are configured to determine a proportion of the administrators, who have received recommendations to perform the recommended admin change, who have performed the recommended admin change. In accordance with the seventh aspect, the one or more processors are configured to notify the administrator of the proportion of the administrators who have performed the recommended admin change. The seventh aspect of the example system may be implemented in combination with the first, second, third, fourth, fifth, and/or sixth aspect of the example system, though the example embodiments are not limited in this respect.

In an implementation of the seventh aspect of the example system, the one or more processors are configured to determine whether the proportion of the administrators who have performed the recommended admin change is greater than or equal to a threshold. In accordance with this implementation, the one or more processors are configured to notify the administrator of the proportion of the administrators who have performed the recommended admin change based at least in part on a determination that the proportion is greater than or equal to the threshold.

In an eighth aspect of the example system, the one or more processors are configured to analyze recommendations of recommended admin changes that are made to the administrators and intended admin changes and categories of information on which the recommendations of the recommended admin changes are based using a machine learning technique to determine the recommended admin change to be recommended. The eighth aspect of the example system may be implemented in combination with the first, second, third, fourth, fifth, sixth, and/or seventh aspect of the example system, though the example embodiments are not limited in this respect.

In a ninth aspect of the example system, the one or more processors are configured to collect user information regarding user changes made on respective client devices of respective end users in the enterprise based at least in part on instructions from the respective end users, each instruction indicating that the respective change is to be made on the respective client device. In accordance with the ninth aspect, the one or more processors are configured to analyze and categorize the user information into the plurality of categories based at least in part on one or more characteristics of the environment in which the user changes are made. In further accordance with the ninth aspect, the one or more processors are configured to cross-reference the type of the intended admin change with the information and the user information to identify the plurality of subsets to which the type corresponds. The ninth aspect of the example system may be implemented in combination with the first, second, third, fourth, fifth, sixth, seventh, and/or eighth aspect of the example system, though the example embodiments are not limited in this respect.

In an example method, a type of intended admin change that an administrator is to perform with regard to an enterprise is determined based at least in part on an operation performed by the administrator using an enterprise management tool. The type of the intended admin change is cross-referenced with information indicating admin changes made by administrators in respective environments of respective enterprises and further indicating values of metrics resulting from the admin changes to identify a plurality of subsets of the information to which the type corresponds. A causal relationship is inferred between one or more admin changes that were made after an admin change of the type, as indicated by the information that is in the subsets, and an increase in one or more values of one or more respective metrics that are indicated by the information that is in the subsets, by analyzing the subsets, based at least in part on cross-referencing the type of the intended admin change with the information that is in the subsets. A recommended admin change, which the information in at least one of the subsets indicates to have been made after an admin change of the type, is recommended to be performed by the administrator based at least in part on one or more categories into which the at least one of the subsets is categorized and further based at least in part on a causal relationship between the recommended admin change and an increase in at least one of the one or more values of at least one of the one or more respective metrics. The information is categorized into a plurality of categories that includes the one or more categories based at least in part on one or more characteristics of the environments in which the admin changes are made.

In a first aspect of the example method, recommending the recommended admin change comprises recommending the recommended admin change via an admin change recommendation service. In accordance with the first aspect, the example method further comprises offering a discount on a cost of using the admin change recommendation service to the administrator. The discount is contingent on the administrator allowing information regarding admin changes made by the administrator to be collected for purposes of contributing to the information regarding the admin changes made by the administrators in the respective environments of the respective enterprises.

In a second aspect of the example method, the example method further comprises determining that the administrator initiates performance of the recommended admin change. In accordance with the second aspect, the example method further comprises populating a plurality of fields that define a plurality of respective attributes of the recommended admin change in an electronic form based at least in part on a determination that the administrator initiates the performance of the recommended admin change. The second aspect of the example method may be implemented in combination with the first aspect of the example method, though the example embodiments are not limited in this respect.

In an implementation of the second aspect of the example method, the example method further comprises providing an inquiry to the administrator. The inquiry requests confirmation that the recommended admin change is to be performed in accordance with the attributes that are defined by the respective fields. In accordance with this implementation, the example method further comprises performing the recommended admin change in accordance with the attributes that are defined by the respective fields based at least in part on receipt of the confirmation from the administrator.

In a third aspect of the example method, the example method further comprises determining that a human has approved recommendation of the recommended admin change to be performed by the administrator. In accordance with the third aspect, recommending the recommended admin change comprises recommending the recommended admin change to be performed by the administrator further based at least in part on a determination that the human has approved the recommendation of the recommended admin change to be performed by the administrator. The third aspect of the example method may be implemented in combination with the first and/or second aspect of the example method, though the example embodiments are not limited in this respect.

An example computer program product comprises a computer-readable storage medium having instructions recorded thereon for enabling a processor-based system to perform operations to provide an admin change recommendation. The operations comprise determine a type of intended admin change that an administrator is to perform with regard to an enterprise based at least in part on an operation performed by the administrator using an enterprise management tool. The operations further comprise cross-reference the type of the intended admin change with information indicating admin changes made by administrators in respective environments of respective enterprises and further indicating values of metrics resulting from the admin changes to identify a plurality of subsets of the information to which the type corresponds. The operations further comprise infer a causal relationship between one or more admin changes that were made after an admin change of the type, as indicated by the information that is in the subsets, and an increase in one or more values of one or more respective metrics that are indicated by the information that is in the subsets, by analyzing the subsets, based at least in part on cross-referencing the type of the intended admin change with the information that is in the subsets. The operations further comprise recommend a recommended admin change, which the information in at least one of the subsets indicates to have been made after an admin change of the type, to be performed by the administrator based at least in part on one or more categories into which the at least one of the subsets is categorized and further based at least in part on a causal relationship between the recommended admin change and an increase in at least one of the one or more values of at least one of the one or more respective metrics. The information is categorized into a plurality of categories that includes the one or more categories based at least in part on one or more characteristics of the environments in which the admin changes are made.

IV. Example Computer System

Figure 8:
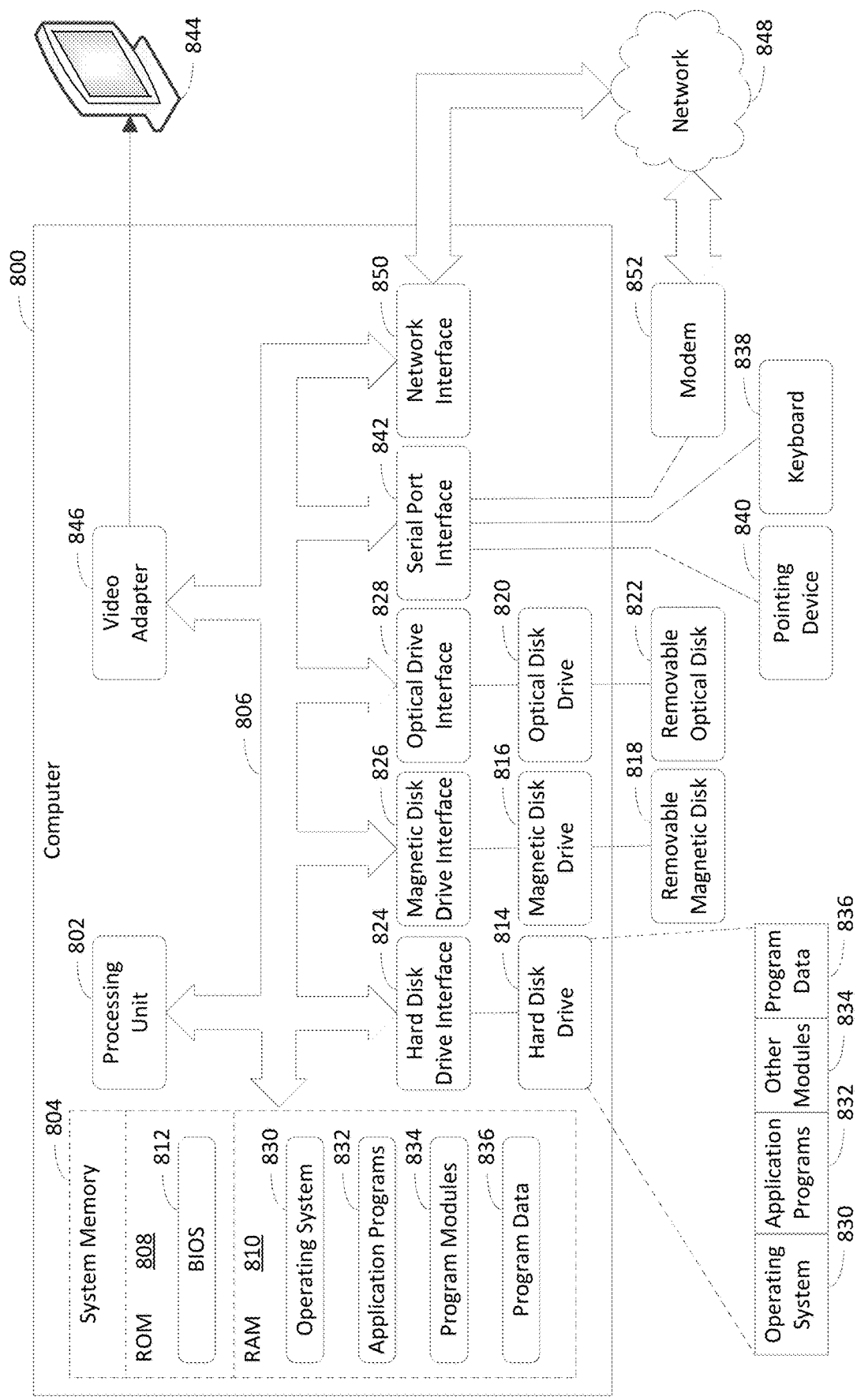
FIG. 8 depicts an example computer in which embodiments may be implemented.

FIG. 8 depicts an example computer 800 in which embodiments may be implemented. Any one or more of user devices 106A-106M, any one or more of admin systems 104A-104M, and/or any one or more of system management server(s) 102 shown in FIG. 1; any one or more of system management server(s) 202, any one or more of customer machines 204A-204D, and/or any one or more of clients 206A-206D shown in FIG. 2; and/or computing system 600 shown in FIG. 6 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) admin change recommendation logic 112, admin change recommendation logic 602, analysis logic 604, determination logic 606, cross-reference logic 608, recommendation logic 610, form logic 612, inquiry logic 614, admin change logic 616, discount logic 618, flowchart 300 (including any step of flowchart 300), flowchart 400 (including any step of flowchart 400), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:
1. A system to provide an admin change recommendation, the system comprising:
  memory; and
  a processing system coupled to the memory, the processing system configured to:
    analyze historical data regarding historical admin changes made in specified environments of specified enterprises to determine that a subset of a plurality of parameters that are collected with regard to the historical admin changes is likely to contribute to changes in corresponding measures of an attribute associated with at least one of a plurality of end users or a plurality of devices that are targeted by the historical admin changes;
    collect information indicating admin changes made in designated environments of designated enterprises and further indicating values of metrics resulting from the admin changes by limiting the information that is collected to the subset of the plurality of parameters;

analyze and categorize the information into a plurality of categories based at least in part on at least one characteristic of the designated environments in which the admin changes are made;

determine a type of intended admin change that is to be performed with regard to a first enterprise based at least in part on an enterprise management tool operation;

cross-reference the type of the intended admin change with the information to identify a plurality of subsets of the information to which the type corresponds;

infer a causal relationship between at least one admin change that was made to a second configuration of a second enterprise after an admin change of the type was made to a first configuration of the second enterprise, as indicated by the information that is in the subsets, and an increase in a value of a metric that is indicated by the information that is in the subsets, by analyzing the subsets, based at least in part on cross-referencing the type of the intended admin change with the information that is in the subsets; and based at least in part on the information in at least one of the subsets indicating that a designated admin change was made to the second configuration of the second enterprise after an admin change of the type was made to the first configuration of the second enterprise and further based at least in part on a causal relationship between the designated admin change and an increase in the value of the metric and further based at least in part on at least one category into which the at least one of the subsets is categorized, recommend the designated admin change to be performed to change a configuration of the first enterprise as a result of a determination that the intended admin change is to be performed with regard to the first enterprise.

2. The system of claim 1, wherein the processing system is configured to:

for each admin change that is indicated by the information, determine an amount that a measure of an attribute associated with at least one of a plurality of end users or a plurality of devices that are targeted by the admin change changes in response to the admin change; and recommend the designated admin change to be performed further based at least in part on the amount that the measure of the attribute for each admin change with which the information in the subsets pertains changes.

3. The system of claim 2, wherein the amount that the measure of the attribute associated with at least one of the plurality of end users or the plurality of devices that are targeted by the admin change changes comprises:

an amount that a user experience score associated with at least one of the plurality of end users or the plurality of devices that are targeted by the admin change changes, the user experience score indicating a quality of a user experience associated with the at least one of the plurality of end users or the plurality of devices.

4. The system of claim 2, wherein the amount that the measure of the attribute associated with at least one of the plurality of end users or the plurality of devices that are targeted by the admin change changes comprises:

an amount that end user productivity of the plurality of end users who are targeted by the admin change changes.

5. The system of claim 2, wherein the processing system is configured to:

collect the information, which includes data regarding at least one of a regional event or a global event,
the regional event impacting behavior of end users of an enterprise within a limited geographical region during a period of time in which the information is collected,
the global event impacting behavior of end users of an enterprise worldwide during the period of time in which the information is collected;

determine an extent to which the at least one of the regional event or the global event changes an amount that a measure of an attribute changes for each admin change; and based at least in part on the information in at least one of the subsets indicating that the designated admin change was made to the second configuration of the second enterprise after the admin change of the type was made to the first configuration of the second enterprise and further based at least in part on the causal relationship between the designated admin change and the increase in the value of the metric and further based at least in part on at least one category into which the at least one of the subsets is categorized and further based at least in part on the extent to which the at least one of the regional event or the global event changes the amount that the measure of the attribute changes for each admin change with which the information in the subsets pertains, recommend the designated admin change to be performed to change the configuration of the first enterprise as the result of the determination that the intended admin change is to be performed with regard to the first enterprise.

6. The system of claim 1, wherein the processing system is configured to:

categorize the information in each category into a plurality of sub-categories corresponding to a plurality of respective tasks that are performed in the designated environments; and recommend the designated admin change to be performed further based at least in part on the sub-categories into which the subsets are categorized.

7. The system of claim 1, wherein the processing system is configured to:

determine whether a human has approved recommendation of the designated admin change to be performed to change the configuration of the first enterprise; and recommend the designated admin change to be performed further based at least in part on a determination that the human has approved the recommendation of the designated admin change to be performed.

8. The system of claim 1, wherein the processing system is configured to:

collect feedback data that indicates ratings of previous recommended admin changes, each rating indicating a quality of a user experience that resulted from performance of the respective previous recommended admin change in response to a recommendation to perform the respective previous recommended admin change; and recommend the designated admin change to be performed further based at least in part on the ratings of the previous recommended admin changes.

9. The system of claim 1, wherein the processing system is configured to:

collect feedback data that indicates whether previous recommended admin changes were performed in response to receipt of recommendations to perform the previous recommended admin changes; and recommend the designated admin change to be performed further based at least in part on whether the previous recommended admin changes were performed in response to receipt of the recommendations.

10. The system of claim 1, wherein the processing system is configured to:
    determine a proportion of administrators, who have received recommendations to perform the designated admin change, who have performed the designated admin change; and
    provide a notification of the proportion of the administrators who have performed the designated admin change.

11. The system of claim 10, wherein the processing system is configured to:
    determine whether the proportion of the administrators who have performed the designated admin change is greater than or equal to a threshold; and
    provide the notification of the proportion of the administrators who have performed the designated admin change based at least in part on a determination that the proportion is greater than or equal to the threshold.

12. The system of claim 1, wherein the processing system is configured to:
    analyze recommendations of designated admin changes and intended admin changes and categories of information on which the recommendations of the designated admin changes are based using a machine learning technique to determine the designated admin change to be recommended.

13. The system of claim 1, wherein the processing system is configured to:
    collect user information regarding user changes made on respective client devices of respective end users in an enterprise based at least in part on instructions from the respective end users, each instruction indicating that the respective change is to be made on the respective client device; and
    analyze and categorize the user information into the plurality of categories based at least in part on at least one characteristic of the environment in which the user changes are made; and
    cross-reference the type of the intended admin change with the information and the user information to identify the plurality of subsets to which the type corresponds.

14. The system of claim 1, wherein the processing system is configured to:
    perform the designated admin change.

15. A method of providing an admin change recommendation, the method comprising:
    analyzing historical data regarding historical admin changes made in specified environments of specified enterprises to determine that a subset of a plurality of parameters that are collected with regard to the historical admin changes is likely to contribute to changes in corresponding measures of an attribute associated with at least one of a plurality of end users or a plurality of devices that are targeted by the historical admin changes;
    collecting information indicating admin changes made in designated environments of designated enterprises and further indicating values of metrics resulting from the admin changes by limiting the information that is collected to the subset of the plurality of parameters;
    determining a type of intended admin change that is to be performed with regard to a first enterprise based at least in part on an enterprise management tool operation;
    cross-referencing the type of the intended admin change with the information indicating the admin changes made in the respective designated environments of respective designated enterprises and further indicating values of metrics resulting from the admin changes to identify a plurality of subsets of the information to which the type corresponds;
    inferring a causal relationship between at least one admin change that was made to a second configuration of a second enterprise after an admin change of the type was made to a first configuration of the second enterprise, as indicated by the information that is in the subsets, and an increase in a value of a metric that is indicated by the information that is in the subsets, by analyzing the subsets, based at least in part on cross-referencing the type of the intended admin change with the information that is in the subsets; and
    based at least in part on the information in at least one of the subsets indicating that a designated admin change was made to the second configuration of the second enterprise after an admin change of the type was made to the first configuration of the second enterprise and further based at least in part on a causal relationship between the designated admin change and an increase in the value of the metric and further based at least in part on at least one category into which the at least one of the subsets is categorized, recommending the designated admin change to be performed to change a configuration of the first enterprise as a result of a determination that the intended admin change is to be performed with regard to the first enterprise, wherein the information is categorized into a plurality of categories that includes the at least one category based at least in part on at least one characteristic of the designated environments in which the admin changes are made.

16. The method of claim 15, wherein recommending the designated admin change comprises:
    recommending the designated admin change via an admin change recommendation service; and
    wherein the method further comprises:
    offering a discount on a cost of using the admin change recommendation service, the discount contingent on allowing information regarding admin changes made with regard to the first enterprise to be collected for purposes of contributing to the information regarding the admin changes made in the designated environments of the designated enterprises.

17. The method of claim 15, further comprising:
    determining that performance of the designated admin change is initiated; and
    populating a plurality of fields that define a plurality of respective attributes of the designated admin change in an electronic form based at least in part on a determination that the performance of the designated admin change is initiated.

18. The method of claim 17, further comprising:
    providing an inquiry that requests confirmation that the designated admin change is to be performed in accordance with the attributes that are defined by the respective fields; and performing the designated admin change in accordance with the attributes that are defined by the respective fields based at least in part on receipt of the confirmation.

19. The method of claim 15, further comprising:
determining that a human has approved recommendation of the designated admin change to be performed;
wherein recommending the designated admin change comprises:
recommending the designated admin change to be performed further based at least in part on a determination that the human has approved the recommendation of the designated admin change to be performed.

20. The method of claim 15, further comprising:
collecting data regarding at least one of a regional event or a global event, the regional event impacting behavior of end users of an enterprise within a limited geographical region during a period of time in which the information is collected, the global event impacting behavior of end users of an enterprise worldwide during the period of time in which the information is collected; and
determining an extent to which the at least one of the regional event or the global event changes an amount that the measure of the attribute changes for each admin change;
wherein recommending the designated admin change to be performed is further based at least in part on the extent to which the at least one of the regional event or the global event changes the amount that the measure of the attribute changes for each admin change with which the information in the subsets pertains.

21. A computer program product comprising a non-transitory computer-readable storage medium having instructions recorded thereon for enabling a processor-based system to perform operations to provide an admin change recommendation, the operations comprising:
analyze historical data regarding historical admin changes made in specified environments of specified enterprises to determine that a subset of a plurality of parameters that are collected with regard to the historical admin changes is likely to contribute to changes in corresponding measures of an attribute associated with at least one of a plurality of end users or a plurality of devices that are targeted by the historical admin changes;
collect information indicating admin changes made in designated environments of designated enterprises and further indicating values of metrics resulting from the admin changes by limiting the information that is collected to the subset of the plurality of parameters;
determine a type of intended admin change that is to be performed with regard to a first enterprise based at least in part on an enterprise management tool operation;
cross-reference the type of the intended admin change with the information, which indicates the admin changes made in the respective designated environments of respective designated enterprises and which further indicates values of metrics resulting from the admin changes, to identify a plurality of subsets of the information to which the type corresponds;
infer a causal relationship between at least one admin change that was made to a second configuration of a second enterprise after an admin change of the type was made to a first configuration of the second enterprise, as indicated by the information that is in the subsets, and an increase in a value of a metric that is indicated by the information that is in the subsets, by analyzing the subsets, based at least in part on cross-referencing the type of the intended admin change with the information that is in the subsets; and
based at least in part on the information in at least one of the subsets indicating that a designated admin change was made to the second configuration of the second enterprise after an admin change of the type was made to the first configuration of the second enterprise and further based at least in part on a causal relationship between the designated admin change and an increase in the value of the metric and further based at least in part on at least one category into which the at least one of the subsets is categorized, recommend the designated admin change to be performed to change a configuration of the first enterprise as a result of a determination that the intended admin change is to be performed with regard to the first enterprise, wherein the information is categorized into a plurality of categories that includes the at least one category based at least in part on at least one characteristic of the designated environments in which the admin changes are made.

* * * * *